United States Patent
Gong et al.

(10) Patent No.: US 7,605,205 B2
(45) Date of Patent: Oct. 20, 2009

(54) NANOCOMPOSITE COMPOSITIONS AND PROCESSES FOR MAKING THE SAME

(75) Inventors: Caiguo Gong, Pearland, TX (US); Anthony Jay Dias, Houston, TX (US); Weiqing Weng, Houston, TX (US); Ramanan Krishnamoorti, Bellaire, TX (US); Carmen Neagu, Friendswood, TX (US); Molly Westermann Johnston, Baytown, TX (US); Beverly Jean Poole, Houston, TX (US); Kriss Randall Karp, Copley, OH (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 651 days.

(21) Appl. No.: 11/267,981

(22) Filed: Nov. 7, 2005

(65) Prior Publication Data

US 2007/0105998 A1     May 10, 2007

(51) Int. Cl.
*C08K 3/34* (2006.01)
(52) U.S. Cl. .................. 524/445; 524/186; 524/447
(58) Field of Classification Search ............... 524/186, 524/445, 447; 501/145
See application file for complete search history.

(56) References Cited

U.S. PATENT DOCUMENTS

| | | | | |
|---|---|---|---|---|
| 4,138,375 | A | * | 2/1979 | Berg et al. .................. 523/334 |
| 4,252,918 | A | * | 2/1981 | Ikeda et al. ................. 525/192 |
| 5,162,445 | A | | 11/1992 | Powers et al. ............. 525/333.4 |
| 5,385,776 | A | * | 1/1995 | Maxfield et al. ......... 428/297.4 |
| 5,576,372 | A | * | 11/1996 | Kresge et al. .............. 524/442 |
| 5,576,373 | A | | 11/1996 | Kresge et al. .............. 524/445 |
| 5,665,183 | A | | 9/1997 | Kresge et al. .............. 152/204 |
| 5,698,640 | A | | 12/1997 | Duvdevani et al. ....... 525/333.4 |
| 5,807,629 | A | | 9/1998 | Elspass et al. .............. 428/323 |
| 5,883,173 | A | | 3/1999 | Elspass et al. .............. 524/446 |
| 5,936,023 | A | | 8/1999 | Kato et al. .................. 524/445 |
| 5,973,053 | A | | 10/1999 | Usuki et al. ................. 524/445 |
| 6,034,164 | A | | 3/2000 | Elspass et al. .............. 524/445 |
| 6,060,549 | A | | 5/2000 | Li et al. ....................... 524/445 |
| 6,103,817 | A | | 8/2000 | Usuki et al. ................. 524/574 |
| 6,828,367 | B1 | | 12/2004 | Campbell |
| 2003/0022963 | A1 | | 1/2003 | Parsons |
| 2004/0132894 | A1 | | 7/2004 | Dias et al. ................... 524/515 |

FOREIGN PATENT DOCUMENTS

| | | |
|---|---|---|
| EP | 0 312 988 A2 | 4/1989 |
| EP | 0 780 340 B1 | 6/1997 |
| EP | 0 846 662 A2 | 6/1998 |
| JP | P2000-160024 | 6/2000 |
| JP | 2000204214 | 7/2000 |
| JP | 2004155912 | 6/2004 |
| KR | 2002006904 * | 1/2002 |
| WO | WO 97/31057 | 8/1997 |
| WO | WO 02/100936 A1 * | 12/2002 |
| WO | WO 03/106549 A2 | 12/2003 |

* cited by examiner

*Primary Examiner*—Katarzyna Wyrozebski
(74) *Attorney, Agent, or Firm*—Nancy T. Krawczyk; Catherine L. Bell

(57) ABSTRACT

The invention provides for processes for preparing a nanocomposite compositions including the steps of: contacting a multifunctional intercalant including a cationic moiety separated from an anionic moiety by at least 1 carbon, with a clay at a temperature and for a period of time sufficient to produce an at least partially intercalated clay; and contacting the at least partially intercalated clay with a functionalized interpolymer including one or more functional groups, at a temperature, and for a period of time sufficient to produce the nanocomposite compositions. Cured nanocomposite compositions, and articles including such nanocomposite compositions are also provided.

81 Claims, No Drawings

NANOCOMPOSITE COMPOSITIONS AND PROCESSES FOR MAKING THE SAME

FIELD OF THE INVENTION

The present invention is directed towards low-permeability nanocomposite compositions, preferably elastomeric nanocomposite compositions comprising an intercalated nanoclay, and more particularly to compositions comprising a halogenated copolymer in combination with a clay intercalated with a multifunctional intercalant, which intercalant comprises a cationic moiety and an anionic moiety. The compositions may also comprise a filler such as carbon black and may form air barriers such as tire innerliners.

BACKGROUND

Tubeless tires require compositions having high air retention. Bromobutyl and chlorobutyl rubbers are the polymers of choice for air-retention in tubeless tires. Similarly, brominated poly(isobutylene-co-p-methylstyrene) (BIMS), such as disclosed in U.S. Pat. Nos. 5,162,445 and 5,698,640, is typically used when heat resistance is of importance. The selection of ingredients for the commercial formulations of elastomers depends upon the balance of properties desired and the application end use. For example, in the tire industry, processing properties of the green (uncured) compound in the tire plant versus in-service performance of the cured rubber tire composite, and the nature of the tire, i.e. bias versus radial tire, and passenger versus truck versus aircraft tire, are all important considerations that must be balanced.

One method to alter product properties and improve air barrier properties is to add clay to an elastomer to form a "nanocomposite". Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. A common type of inorganic particle used in nanocomposites are phyllosilicates, an inorganic substance from the general class of so called "nano-clays" or "clays". Ideally, intercalation should take place in the nanocomposite, wherein the polymer inserts into the space or gallery between the clay surfaces. Ultimately, it is desirable to have near complete exfoliation, wherein the polymer is fully dispersed or intercalated with the individual nanometer-size clay platelets. Due to the general enhancement in air barrier qualities of various polymer compositions when clays are present, there is a desire to have a nanocomposite with low air permeability.

Nanocomposites have been formed using brominated copolymers of isobutylene and p-methylstyrene. See, for example, Elspass et. al., U.S. Pat. Nos. 5,807,629, 5,883,173, and 6,034,164. Further improvement in the uncured and cured properties of these elastomeric compositions can be achieved by the use of processing aids. For example, resins and oils (or other "processing aids") such as naphthalenic, paraffinic, and aliphatic resins may be used to improve the processability of elastomeric compounds. However, increased processability often comes at the price of a loss of air impermeability and an increase in undesirable effects of various other properties. Yet another possible negative impact is the release of processing aids into the final product, and the effect degradation products have on the overall properties of the matrix.

In order to produce nanocomposites, organoclays must be exfoliated. Exfoliation of organoclays may be accomplished using an intercalant. At least partially intercalated organoclays may also be produced through solution based ion-exchange reactions that replace sodium ions that exist on the surface of particular clays, e.g., sodium montmorillonite, with alkyl or aryl ammonium compounds. One of the deficiencies of this method is the limited thermal stability of the amines. Another deficiency is the lack of chemical bonding between the clay and the polymer matrix the clay is distributed in. These deficiencies often lead to poor mechanical properties and reduced processing characteristics.

One method to improve the organoclay performance is to use functionalized polymers to treat the clay. This approach has been limited to materials that are soluble in water or to materials that can be incorporated into the polymerization reaction. This approach has been used to prepare nylon nanocomposites, using for example, oligomeric and monomeric caprolactam as the modifier. Polyolefin nanocomposites have utilized maleic anhydride grafted polyolefins to achieve some success in the formation of nanocomposites.

For example, it is known to utilize exfoliated-clay filled nylon as a high impact plastic matrix, such as disclosed in U.S. Pat. No. 6,060,549 to Li et al. In particular, Li et al. disclose a blend of a thermoplastic resin such as nylon and a copolymer of a $C_4$ to $C_7$ isomonoolefin and a para-methylstyrene and a para-(halomethylstyrene), the blend also including nylon containing exfoliated-clays that are used as a high impact material. Further, Japanese Unexamined Application P2000-160024 to Yuichi et al. discloses a thermoplastic elastomer composition which can be used as an air barrier. The nanocomposite in Yuichi et al. includes is blend similar to that disclosed in Li et al.

Nanocomposites have also been formed using brominated copolymers of isobutylene and para-methylstyrene. See, for example, Elspass et. al., U.S. Pat. No. 5,807,629, U.S. Pat. No. 5,883,173, and U.S. Pat. No. 6,034,164. It has been found that the efficiency of clay exfoliation is increased by increasing bromination level of the polymer. Unfortunately, these copolymers are very reactive and it is difficult to achieve high levels of functionalization without undue added vulcanization. Optimal performance in many applications requires the minimum level of vulcanization that yields acceptable physical properties, in that way aging and durability of the compositions are maximized.

Thus, there is still a problem of achieving a nanocomposite suitable for an air barrier, in particular, an air barrier incorporating the copolymer (or "interpolymer") of a $C_4$ to $C_7$ isomonoolefin and a para-methylstyrene and a para-(halomethylstyrene). Enhancement of processability properties of such copolymers tends to result in copolymers having poor air barrier properties. What is needed is an exfoliated nanocomposite of a halogenated copolymer of a $C_4$ to $C_7$ isomonoolefin, a para-methylstyrene and a para-(halomethylstyrene), having both air barrier properties and improved processability properties.

SUMMARY OF THE INVENTION

In one aspect of the present invention, a process for preparing a nanocomposite composition comprises the steps of:

contacting a multifunctional intercalant comprising a cationic moiety separated from an anionic moiety by at least 1 carbon, with a clay at a temperature and for a period of time sufficient to produce an at least partially intercalated clay; and contacting the at least partially intercalated clay with a functionalized interpolymer comprising one or more functional groups, at a temperature, and for a period of time sufficient to produce the nanocomposite composition.

In another aspect of the present invention, the multifunctional intercalant is represented by the formula:

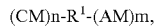
(CM)n-R$^1$-(AM)m, wherein:

CM is a cationic moiety;

R$^1$ comprises at least 1 carbon atom;

AM is an anionic moiety; and n and m are each greater than or equal to 1.

In another aspect of the present invention, the multifunctional intercalant is represented by the structure R$^2$R$^3$N—R$^1$-AM, or R$^2$R$^3$R$^4$N+—R$^1$-AM, wherein R$^1$ is a $C_1$ to $C_{50}$ hydrocarbyl, substituted hydrocarbyl, halocarbyl, or substituted halocarbyl; and wherein R$^2$, R$^3$, and R$^4$ when present, are each independently, hydrogen, $C_1$ to $C_{30}$ hydrocarbyls, substituted hydrocarbyls, halocarbyls, or substituted halocarbyls.

In yet another aspect of the present invention, a process for preparing a nanocomposite composition comprises the steps of:

contacting a multifunctional intercalant comprising a cationic moiety separated from an anionic moiety by at least 1 carbon, with a clay at a temperature, at an acidic pH, and for a period of time sufficient to produce a chemical bond and/or physical interaction between the cationic moiety of the multifunctional intercalant and the clay, to produce an at least partially intercalated clay; and contacting the at least partially intercalated clay with a functionalized interpolymer at a temperature, at a basic pH, and for a period of time sufficient to produce a chemical bond and/or physical interaction between the anionic moiety of the multifunctional intercalant and the functionalized interpolymer, to produce the nanocomposite composition.

In still another aspect of the present invention, a process for preparing a nanocomposite composition comprises the steps of:

a) contacting a multifunctional intercalant comprising a cationic moiety separated from an anionic moiety by at least 1 carbon atom with a clay at a temperature and for a period of time sufficient to produce an at least partially intercalated clay;

b) dissolving at least a portion of a functionalized interpolymer in a solvent to produce a functionalized interpolymer mixture; and c) contacting the at least partially intercalated clay with the functionalized interpolymer mixture at a temperature, and for a period of time sufficient to produce the nanocomposite composition.

In yet still another aspect of the present invention, a process for preparing a nanocomposite composition comprises the steps of:

a) contacting a multifunctional intercalant comprising a cationic moiety separated from an anionic moiety by at least 1 carbon atom with a clay at a temperature, for a period of time, and at an acidic pH sufficient to produce an at least partially intercalated clay;

b) dissolving at least a portion of a functionalized interpolymer in a solvent to produce a functionalized interpolymer mixture; and c) contacting the at least partially intercalated clay with the functionalized interpolymer mixture at a temperature, and for a period of time sufficient to produce the nanocomposite composition.

In yet another aspect of the present invention, a process for preparing a nanocomposite composition comprises the steps of:

a) contacting a multifunctional intercalant comprising a cationic moiety separated from an anionic moiety by at least 1 carbon with a clay in the presence of a cationic surfactant at a temperature, for a period of time, and at an acidic pH sufficient to produce an at least partially intercalated clay;

b) dissolving at least a portion of a functionalized interpolymer in a solvent to produce a functionalized interpolymer mixture; and c) contacting the at least partially intercalated clay with the functionalized interpolymer mixture at a temperature, and for a period of time sufficient to produce the nanocomposite composition.

In yet another aspect of the present invention, a process for preparing a nanocomposite composition comprises the steps of:

a) contacting a multifunctional intercalant comprising a cationic moiety separated from an anionic moiety by at least 1 carbon with a clay in the presence of a cationic surfactant at a temperature, for a period of time, and at an acidic pH sufficient to produce an at least partially intercalated clay;

b) dissolving at least a portion of a functionalized interpolymer in a solvent to produce a functionalized interpolymer mixture; and c) contacting the at least partially intercalated clay with the functionalized interpolymer mixture at a pH of greater than 7, at a temperature, and for a period of time sufficient to produce the nanocomposite composition.

In another aspect of the present invention, an article comprises a nanocomposite composition of the inventive process.

In another aspect of the present a tire interliner or a tire inner tube comprises the nanocomposite composition of the inventive process.

In another aspect of the present invention, the nanocomposite composition of the inventive process comprises a d100 d-spacing determine using X-ray diffraction of greater than 20 Angstroms.

In another aspect of the present invention, the nanocomposite composition of the inventive process comprises an oxygen transmission rate of less than 100 mm-cc/m2 day at 40° C.

DETAILED DESCRIPTION OF THE INVENTION

For the purposes of this invention and the claims thereto and for ease of reference when a polymer is referred to as comprising a monomer, the monomer is present in the polymer in the polymerized form. For purposes of this disclosure, the term oligomer refers to compositions having 2-40 mer units and the term polymer refers to compositions having 41 or more mer units. A mer is defined as a unit of an oligomer or polymer that originally corresponded to the monomer(s) used in the oligomerization or polymerization reaction. For example, the "mer" of polyethylene would be ethylene. For simplicity, when polymers are referred to, the reference may also apply to oligomers, unless specifically specified otherwise. Accordingly, the term polymer and oligomer may be referred to interchangeably herein unless otherwise specified. In addition, unless otherwise stated, the term "polymer" and "interpolymer" may include both homopolymers (i.e., a polymer comprising essentially one monomer), and/or a copolymer (i.e., a polymer comprising more than one monomer).

Throughout, limiting ranges are disclosed for various physical properties and component compositions. It is noted that throughout, any lower range end may be combined with any upper range end of the same property to provide a particular range for any disclosed physical and/or compositional property.

The term "phr" is parts per hundred rubber, and is a measure common in the art wherein components of a composition are measured relative to the major elastomer component, based upon 100 parts by weight of the elastomer or elastomers.

As used herein, in reference to Periodic Table "Groups", the new numbering scheme for the Periodic Table Groups are used as in HAWLEY'S CONDENSED CHEMICAL DICTIONARY 852 (13th ed. 1997).

The term "elastomer", as used herein, refers to any polymer or composition of polymers consistent with the ASTM D1566 definition. The term "elastomer" may be used interchangeably with the term "rubber", as used herein.

The present invention includes nanocomposite compositions of halogenated elastomers and at least partially exfoliated clays treated with a multifunctional intercalant and a cationic surfactant. The multifunctional intercalant preferably comprises a cationic moiety separated from an anionic moiety by at least 1, preferably at least 4 carbon atoms. Preferably, the anionic moiety of the multifunctional intercalant is capable of reacting with the functionalized interpolymer (e.g., the halogenated elastomer) to form any type of chemical bond or a physical interaction (e.g., ionic, coordination, covalent, van der Waals forces, or the like) between the two, and the cationic moiety of the multifunctional intercalant is capable of reacting with the clay to form any type of chemical bond or physical attraction between the two, thus interacting the clay. The functionalized interpolymer is preferably a halogenated elastomer, which comprises $C_4$ to $C_7$ isoolefin derived units, para-methylstyrene derived units and para-(halomethylstyrene) derived units in one embodiment, and comprising $C_4$ to $C_7$ isoolefin derived units, multiolefin derived units, and halogenated multiolefin derived units in another embodiment. The nanocomposite can also include other cross-linking agents, thermoplastics, secondary rubbers, other additives, or other "general purpose rubbers" as described herein.

Functionalized Interpolymer

The functionalized interpolymer comprises a functionalized elastomer, which may be interchangeably referred to herein merely as an interpolymers and/or a random elastomeric copolymer. By functionalized, it is meant the interpolymer comprises one or more functional group(s) which include halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; isocyanide, amino and mixtures thereof. Functional groups are preferably bromine, chlorine, or iodine, with bromine being most preferred.

The functionalized interpolymers preferably comprise $C_2$-$C_8$ olefin monomer, an alkylstyrene monomer, and a functionalized alkylstyrene monomer. In a preferred embodiment, the olefin comprises a $C_4$ to $C_7$ isomonoolefin, such as isobutylene, and/or the alkyl styrene comprises a para-alkylstyrene monomer, preferably para-methylstyrene.

In an embodiment, the functionalized interpolymer comprises at least 80%, more preferably at least 90% by weight of the para-isomer. functionalized interpolymers include those wherein at least some of the alkyl substituents groups present in the styrene monomer units contain benzylic halogen or some other functional group. In another embodiment of the invention, the functionalized interpolymer is a random elastomeric copolymer of ethylene or a $C_3$ to $C_6$ α-olefin and a para-alkylstyrene comonomer, preferably para-methylstyrene containing at least 80%, more preferably at least 90% by weight of the para-isomer, and also including functionalized interpolymers wherein at least some of the alkyl substituents groups present in the styrene monomer units contain benzylic halogen, preferably benzylic bromine, or some other functional group. Preferred materials may be characterized as functionalized interpolymers containing the following monomer units randomly spaced along the polymer chain:

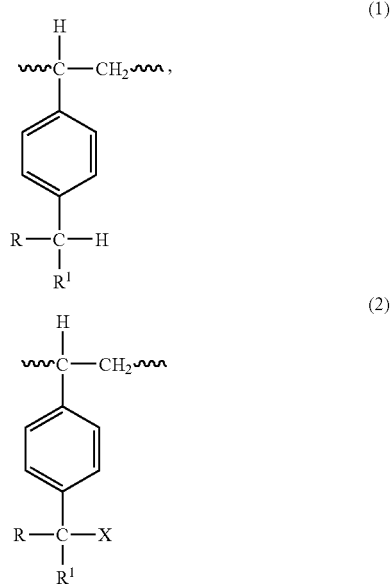

wherein R and $R^1$ are independently hydrogen, lower alkyl, preferably $C_1$ to $C_7$ alkyl and primary or secondary alkyl halides and X is a functional group or a leaving group such as halogen. Preferably R and $R^1$ are each hydrogen. Up to 60 mol % of the para-substituted styrene present in the functionalized interpolymer structure may be the functionalized structure (2) above in one embodiment, and in another embodiment from 0.1 to 5 mol %. In yet another embodiment, the amount of functionalized structure (2) is from 0.4 to 1 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. X is preferably bromine, chlorine, or iodine, with bromine being most preferred. These functionalized isomonoolefin copolymers, their method of preparation, methods of functionalization, and cure are more particularly disclosed in U.S. Pat. No. 5,162,445.

Most useful of such functionalized materials are elastomeric random interpolymers of isobutylene and para-methylstyrene containing from 0.5 to 20 mol % para-methylstyrene wherein up to 60 mol % of the methyl substituent groups present on the benzyl ring contain a bromine or chlorine atom, preferably a bromine atom (para-bromomethylstyrene), as well as acid or ester functionalized versions thereof.

In a preferred embodiment, the functionality is selected such that it can react or form polar bonds with functional groups present in the matrix polymer, for example, acid, amino or hydroxyl functional groups, preferably when the polymer components are mixed at high temperatures.

These functionalized interpolymers preferably have a substantially homogeneous compositional distribution such that at least 95% by weight of the polymer has a para-alkylstyrene content within 10% of the average para-alkylstyrene content of the polymer. Desirable functionalized interpolymers are also characterized by a narrow molecular weight distribution (Mw/Mn) of less than 5, more preferably less than 2.5, a preferred weight average molecular weight in the range of from 200,000 up to 2,000,000 and a preferred number average molecular weight in the range of from 25,000 to 750,000 as determined by gel permeation chromatography.

The functionalized interpolymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred functionalized interpolymers include so-called "BIMS" polymers comprising brominated polymers that generally contain from 0.1 to 10 mol %, more preferably 0.1 to 5 mol % of bromomethylstyrene groups relative to the total amount of monomer derived units in the polymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 in yet another embodiment, wherein a desirable range may be any combination of any upper limit with any lower limit.

Expressed another way, preferred functionalized interpolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment of the invention, the functionalized interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the functionalized interpolymer from 0.4 to 3.0 mol % based on the total number of para-methylstyrene, and wherein the para-methylstyrene derived units are present from 3 wt % to 15 wt % based on the total weight of the polymer in one embodiment, and from 4 wt % to 10 wt % in another embodiment. In another embodiment, the para-(halomethylstyrene) is para-(bromomethylstyrene).

The nanocomposite of the present invention may also include a functionalized interpolymer comprising a halogenated butyl rubber component, either alone, or with another functionalized interpolymer. In one embodiment of the invention, the functionalized interpolymer comprises a halogenated copolymer of a $C_4$ to $C_6$ isoolefin and a multiolefin. In another embodiment, the functionalized interpolymer comprises a blend of a polydiene or block copolymer, and a copolymer of a $C_4$ to $C_6$ isoolefin and a conjugated, or a "star-branched" butyl polymer. The functionalized interpolymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber.

In one embodiment, the functionalized interpolymer comprises a halogenated butyl rubber, comprising a brominated butyl rubber, and in another embodiment a chlorinated butyl rubber. General properties and processing of halogenated butyl rubbers are described in THE VANDERBILT RUBBER HANDBOOK 105-122 (Robert F. Ohm ed., R. T. Vanderbilt Co., Inc. 1990), and in RUBBER TECHNOLOGY 311-321 (Maurice Morton ed., Chapman & Hall 1995). Butyl rubbers, halogenated butyl rubbers, and star-branched butyl rubbers are also described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

Accordingly, the functionalized interpolymer may comprise a halogenated rubber component which may include, but is not limited to, brominated butyl rubber, chlorinated butyl rubber, star-branched polyisobutylene rubber, star-branched brominated butyl(polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethy-styrene, and the like; halomethylated aromatic interpolymers as in U.S. Pat. No. 4,074,035 and U.S. Pat. No. 4,395,506; isoprene and halogenated isobutylene copolymers, polychloroprene, and the like; and mixtures of any of the above. Some embodiments of the halogenated rubber component are also described in U.S. Pat. Nos. 4,703,091 and 4,632,963.

More particularly, in one embodiment of the brominated rubber component of the invention, a halogenated butyl rubber is used. As used herein, "halogenated butyl rubber" refers to both butyl rubber and so-called "star-branched" butyl rubber, described herein. The halogenated butyl rubber is produced from the halogenation of butyl rubber. Preferably, the olefin polymerization feeds employed in producing the halogenated butyl rubber of the invention are those olefinic compounds conventionally used in the preparation of butyl-type rubber polymers. The butyl polymers are prepared, by reacting a comonomer mixture, the mixture having at least (1) a $C_4$ to $C_6$ isoolefin monomer component such as isobutylene with (2) a multiolefin, or conjugated diene, monomer component. The isoolefin is in a range from 70 to 99.5 wt % by weight of the total comonomer mixture in one embodiment, and 85 to 99.5 wt % in another embodiment. The conjugated diene component in one embodiment is present in the comonomer mixture from 0.5 to 30 wt % in one embodiment, and from 0.5 to 15 wt % in another embodiment. In yet another embodiment, from 0.5 to 8 wt % of the comonomer mixture is conjugated diene.

The isoolefin is a $C_4$ to $C_6$ compound such as isobutylene, isobutene 2-methyl-1-butene, 3-methyl-1-butene, 2-methyl-2-butene, and 4-methyl-1-pentene. The multiolefin is a $C_4$ to $C_14$ conjugated diene such as isoprene, butadiene, 2,3-dimethyl-1,3-butadiene, myrcene, 6,6-dimethyl-fulvene, cyclopentadiene, hexadiene and piperylene. One embodiment of the butyl rubber polymer of the invention is obtained by reacting 92 to 99.5 wt % of isobutylene with 0.5 to 8 wt % isoprene, or reacting 95 to 99.5 wt % isobutylene with from 0.5 wt % to 5.0 wt % isoprene in yet another embodiment.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, RUBBER TECHNOLOGY at 298-299 (1995). In one embodiment, the butyl rubber is halogenated in hexane diluent at from 40 to 60° C. using bromine ($BR^2$) or chlorine (Cl2) as the halogenation agent. The halogenated butyl rubber has a Mooney Viscosity of from 20 to 70 (ML 1+8 at 125° C.) in one embodiment, and from 25 to 55 in another embodiment. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1 to 2.2 wt %.

In another embodiment, the halogenated butyl or star-branched butyl rubber may be halogenated such that the halogenation is in the primary allylic position. This is typically achieved by such means as free radical bromination or free radical chlorination, or by such methods as secondary treatment halogenated rubbers, such as by heating the rubber, to form the allylic halogenated butyl and star-branched butyl rubber. Common methods of forming the allylic halogenated polymer are disclosed by Gardner et al. in U.S. Pat. No. 4,632,963; U.S. Pat. No. 4,649,178; U.S. Pat. No. 4,703,091. Thus, in one embodiment of the invention, the halogenated butyl rubber is such that the halogenated multiolefin units are primary allylic halogenated units, and wherein the primary allylic configuration is present to at least 20 mol % (relative to the total amount of halogenated multiolefin) in one embodiment, and at least 30 mol % in another embodiment. This arrangement can be described as follows (3), wherein X is a halogen, desirably chlorine or bromine, and q is at least 10 mol % based on the total moles of halogen in one embodiment, and at least 30 mole % in another embodiment, and from 25 mol % to 90 mol % in yet another embodiment:

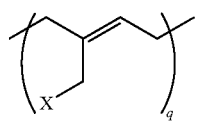

(3)

A commercial embodiment of the halogenated butyl rubber of the present invention is Bromobutyl 2222 (ExxonMobil Chemical Company). Its Mooney Viscosity is from 27 to 37 (ML 1+8 at 125° C., ASTM 1646, modified), and the bromine content is from 1.8 to 2.2 wt %. Another commercial embodiment of the halogenated butyl rubber is Bromobutyl 2255 (ExxonMobil Chemical Company). Its Mooney Viscosity is from 41 to 51 (ML 1+8 at 125° C., ASTM 1646, modified), and the bromine content is from 1.8 to 2.2 wt %. The invention is not limited to the commercial source of any of the halogenated rubber components.

In another embodiment, the functionalized interpolymer comprises a brominated rubber component which is a branched or a "star-branched" halogenated butyl rubber. In one embodiment, the star-branched halogenated butyl rubber ("SBHR") is a composition of a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The invention is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

In one embodiment, the SBHR is typically a composition of the butyl or halogenated butyl rubber as described herein and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, at greater than 0.3 wt % in one embodiment, and from 0.3 to 3 wt % in another embodiment, and from 0.4 to 2.7 wt % in yet another embodiment.

When present in the functionalized interpolymer of the present invention, the halogenated rubber component is present in the inventive composition from at least 10 phr, preferably at least 20 phr, more preferably at least 30 phr. The halogenated rubber component is also preferably present in the inventive composition at less than 90 phr, preferably less than 80 phr, more preferably at less than 70 phr, wherein a desirable range may be any combination of any upper phr limit with any lower phr limit.

Clay

Compositions of the present invention include at least one functionalized interpolymer as described above that has been contacted by any suitable means with at least one partially exfoliated clay. The at least partially exfoliated clay is produced through combination of a clay with a multifunctional intercalant comprising a cationic moiety separated from an anionic moiety by at least 1 carbon atom.

Clays suitable for use herein include swellable layered clay materials, which include natural and/or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These so-called layered clays generally comprise particles containing a plurality of silicate platelets having a thickness of 8-12 Å (0.8-1.2 nanometers (nm)) tightly bound together at interlayer spacings of 4 Å or less, and contain exchangeable cations such as Na+; Ca+2, K+ or Mg+2 present at the interlayer surfaces.

The layered clay of the present invention is at least partially intercalated and exfoliated by treatment with, reaction with, referred to herein as "contacting" the clay with one or more organic molecules (swelling or exfoliating "agents" or "additives") capable of undergoing ion exchange reactions with the cations present at the interlayer surfaces of the layered clay.

In an embodiment, the at least partially exfoliated clay may be produced by pre-mixing the clay with the multifunctional intercalant and optionally one or more additional exfoliating additives. In another embodiment, the at least partially exfoliated clay may be produced by being combined with the multifunctional intercalant and optionally one or more additional exfoliating additives in the presence of the functionalized interpolymer of the present invention.

The amount of the at least partially intercalated clay incorporated in the nanocomposites in accordance with an embodiment of the invention is sufficient to develop an improvement in the mechanical properties or barrier properties of the nanocomposite, for example, tensile strength and/or oxygen permeability, and/or air permeability. Amounts generally will range from 0.5 to 10 wt % of the clay based on the total weight of the composition. Preferably, the at least partially intercalated clay is present from 1 to 5 wt %. Expressed in parts per hundred rubber, the exfoliated clay (i.e., the at least partially intercalated clay) may be present from 1 to 30 phr in one embodiment, and from 5 to 20 phr in another embodiment.

Multifunctional Intercalant

Clays of the present invention are at least partially intercalated with a multifunctional intercalant. Multifunctional intercalants may comprise a cationic moiety separated from an anionic moiety by at least 1 carbon atom, represented by the following structure:

(CM)n-$R^1$-(AM)m, wherein

CM represents a cationic moiety;
$R^1$ comprises at least 1 carbon atom;
AM represents an anionic moiety; and
n and m are each greater than or equal to 1.

Preferred cationic moieties include ammonium ions, phosphonium ions, and/or a cation derived from one or more of phosphines, alkyl and aryl sulfides, thiols, and their polyfunctional versions. Preferred ammonium ions include substituted ammonium ions, protonated alkylamines, alkylammonium (primary, secondary, tertiary) and quaternary ammonium salts. Desirable multifunctional intercalants include those comprising amine moieties, including compounds (or the corresponding ammonium ion) with the structure $R^2R^3N$—$R^1$-AM, and $R^2R^3R^4N+$—$R^1$-AM, wherein $R^1$ is a $C_1$ to $C_{50}$ hydrocarbyl, substituted hydrocarbyl, halocarbyl, and/or substituted halocarbyl, including substituted and unsubstituted alkyls, aryls, and alkenes, and substituted and unsubstituted halogenated alkyls, halogenated aryls, and halogenated alkenes; and wherein $R^2$, $R^3$, and optionally $R^4$ (i.e., $R^4$ when present), are each independently, hydrogen, $C_1$ to $C_{30}$ hydrocarbyls, substituted hydrocarbyls, halocarbyls, and substituted halocarbyls, including substituted and unsubstituted alkyls, aryls, and alkenes, and substituted and unsubstituted halogenated alkyls, halogenated aryls, and halogenated alkenes.

In a preferred embodiment, $R^1$ comprises at least 4 carbon atoms, preferably at least 5 carbons, preferably at least 6 carbons, preferably at least 7 carbons, preferably at least 8 carbons, preferably at least 9 carbons, preferably at least 10 carbons, preferably at least 11 carbons, preferably at least 12 carbons, preferably at least 13 carbons, preferably at least 14 carbons, preferably at least 15 carbons, preferably at least 16 carbons, preferably at least 17 carbons, preferably at least 18 carbons, preferably at least 19 carbons, preferably at least 20 carbons, preferably at least 21 carbons, more preferably at least 22 carbons. In another embodiment, $R^1$ comprises 4 to 20 carbons, preferably 4 to 15 carbons, with 10 to 12 carbons being most preferred.

In another preferred embodiment, $R^2$, $R^3$, and optionally $R^4$ (i.e., $R^4$ when present), comprise hydrogen, or from 1 to 50 carbons, preferably from 1 to 20 carbons, preferably from 1 to 10 carbons, preferably from 1-5 carbons, preferably from 1-4 carbons, preferably from 1-3 carbons, preferably 1-2 carbons. Groups $R^2$, $R^3$, and optionally $R^4$ (i.e., $R^4$ when present), may also include heteroatoms such as oxygen, sulfur, and the like. Examples include ethoxylates (EO), propoxylates (PO), and the like. Preferred examples include ethoxylated and/or propoxylated $C_4$-$C_22$ amines having from 2 to 50 moles of a combination of EO and PO.

In a more preferred embodiment, $R^2$ and $R^3$ are methyl or ethyl, $R^4$ is hydrogen, and $R^1$ is a $C_8$-$C_{12}$ aliphatic alkyl or substituted aliphatic alkyl, more preferably a $C_{10}$-$C_{12}$ aliphatic alkyl or substituted aliphatic alkyl. In another preferred embodiment, $R^2$ and $R^3$ are methyl or ethyl, $R^4$ is hydrogen, and $R^1$ is a $C_6$-$C_{10}$ aromatic group or a substituted aromatic group. In another preferred embodiment, the multifunctional intercalant comprises a protonated so called "long chain tertiary amine", wherein at least $R^1$ is a $C_14$ to $C_{20}$ alkyl or alkene.

Preferred anionic moieties include carboxylic acids; carboxy salts; carboxy esters, amides and imides; hydroxy; alkoxide; phenoxide; thiolate; thioether; xanthate; cyanide; cyanate; phosphates; phosphites; sulfates; sulfites; and the like, all of which are capable of forming anionic functional groups at or above a particular pH. More preferred anionic moieties include carboxylate anions (CA-$R^1$—COO—.)

Most preferred multifunctional intercalants include protonated amino acids and salts thereof, containing 4-30 carbon atoms. Preferred examples include alanine, arginine, asparagines, aspartic acid, cysteine, glutamine, glutamic acid, glycine, histidine, isoleucine, leucine, lysine, methionine, phenylalanine, proline, serine, threonine, tryptophan, tyrosine, valine, aspartic acid, glutamic acid, 12-aminododecanoic acid, N-substituted 12-aminododecanoic acid, N,N-disubstituted 12-aminododecanoic acid, and N,N,N-trisubstituted 12-aminododecanoic acid, wherein the N-substituents are $C_1$-$C_{12}$ alkyl groups. Other preferred examples include epsilon-caprolactam, substituted and unsubstituted aminobenzoic acid, and like materials. More preferred multifunctional intercalants include $C_1$-$C_{10}$ alkyl substituted aminobenzoic acid, with dimethylaminobenzoic acid being particularly preferred.

The multifunctional intercalant may be used alone, or in combination with other swelling agents, exfoliants, and/or intercalants. Other suitable intercalants include exfoliating additives include those which can be covalently bonded to the interlayer surfaces. These include polysilanes of the structure —Si($R^5$)$_2R^6$ where $R^5$ is the same or different at each occurrence and is selected from alkyl, alkoxy or oxysilane and $R^6$ is an organic radical compatible with the functionalized interpolymer of the composition. Processes for intercalating layered silicates, include those disclosed in U.S. Pat. Nos. 4,472, 538, 4,810,734, and 4,889,885, as well as WO92/02582.

Examples of additional exfoliating additive or additives include all primary, secondary and tertiary amines and phosphines; alkyl and aryl sulfides and thiols; and their polyfunctional versions. Desirable additives include long-chain tertiary amines such as N,N-dimethyl-octadecylamine, N,N-dioctadecyl-methylamine, dihydrogenated tallowalkyl-methylamine and the like, and amine-terminated polytetrahydrofuran; and/or long-chain thiol and/or thiosulfate compounds including hexamethylene sodium thiosulfate, and the like.

The multifunctional intercalant and optionally, other exfoliating additives as described herein, may be present in the composition in an amount to achieve exfoliation of the clay such that an improved air retention as measured by the permeability testing described herein is achieved in the compositions of the present invention relative to comparative examples. For example, the multifunctional intercalant may be present from 0.1 to 20 phr in one embodiment, and from 0.2 to 15 phr in yet another embodiment, and from 0.3 to 10 phr in yet another embodiment. The multifunctional intercalant may be contacted with the clay of the composition at any stage; for example, the multifunctional intercalant may be added to the functionalized interpolymer, followed by addition of the clay, or may be contacted with the functionalized interpolymer and clay mixture; or the multifunctional intercalant may be first contacted with the clay under appropriate pH conditions, followed by contacting with the functionalized interpolymer or other additives, fillers, rubbers, curatives, and the like.

Contacting of the multifunctional intercalant with the clay is conducted under conditions which result in intercalation or "exfoliation" of the layered platelets of the clay, preferably as a consequence of a reduction of the ionic forces holding the layers together and introduction of molecules between layers which serve to space the layers at distances of greater than 4 Å, preferably greater than 9 Å. This separation allows the layered silicate to more readily polymeric material between the layers and facilitates further delamination of the layers when the intercalate is subjected to shear through mixing, milling, or otherwise blending with matrix functionalized interpolymer material to provide a uniform dispersion of the exfoliated layers within the functionalized interpolymer matrix of the composition.

Intercalation Modifier

Compositions of the present invention include at least one functionalized interpolymer as described above that has been contacted by any suitable means with an at least one partially exfoliated clay. The at least partially exfoliated clay is produced through combination of the clay with a multifunctional intercalant comprising a cationic moiety separated from an anionic moiety by at least 1, preferably at least 4 carbon atoms. Accordingly, processes of the present invention may further comprising the step of contacting the multifunctional intercalant with the clay, and/or contacting the at least partially intercalated clay with the functionalized interpolymer in the presence of an intercalation modifier, wherein the intercalation modifier is a surface active agent such as a surfactant, a block copolymer, a wetting agent, an emulsifying agent, or a combination thereof.

The addition of the intercalation modifier preferably functions to improve exfoliation of the clay, and/or provide a more uniform dispersion of the at least partially exfoliated clay within the functionalized interpolymer matrix.

Examples of intercalation modifiers include ionic and nonionic surfactants including block copolymers, wetting agents, emulsifying agents, and the like. A wide range of such surfactants is available and can be selected readily by those skilled in the art from "The Handbook of Industrial Surfactants," 2nd Edition, Gower (1997), which is incorporated herein by reference in its entirety for all purposes. There is no restriction on the type or chemical class of surfactant that can be used. Accordingly, nonionic, anionic, cationic and amphoteric surfactants, or combinations of more than one of these types, are all useful as intercalation modifiers in the present invention.

Among nonionic surfactants, exemplary classes include polyoxyethylene alkyl, alkyne, alkynyl or alkylaryl ethers, such as polyoxyethylene primary or secondary alcohols, alkylphenols or acetylenic diols; polyoxyethylene alkyl or alkyne esters, such as modified fatty acids, ethoxylated fatty acids; sorbitan alkylesters, whether ethoxylated or not; glyceryl alkylesters; sucrose esters; and alkyl polyglycosides. Exemplary anionic surfactant classes include fatty acids, sulfates, sulfonates, and phosphate mono- and diesters of alcohols, alkylphenols, polyoxyethylene alcohols and polyoxyethylene alkylphenols, and carboxylates of polyoxyethylene alcohols and polyoxyethylene alkylphenols. These can be used in their acid form but are more typically used as salts, for example sodium, potassium or ammonium salts.

Preferred intercalation modifiers include cationic surfactants including polyoxyethylene and/or polyoxypropylene tertiary $C_1$-$C_1$8 alkylamines, $C_1$-$C_1$8 substituted tertiary alkylamines, $C_1$-$C_1$8 substituted tertiary alkenylamines, ethoxylated and/or propoxylated fatty amines, $C_1$-$C_1$8 alkyl-substituted fatty amines, polyoxyethylene and/or polyoxypropylene $C_1$-$C_1$8 alkyletheramines, polyoxyethylene and/or polyoxypropylene cocoamines, polyoxyethylene and/or polyoxypropylene tallowamines, polyoxyethylene and/or polyoxypropylene quaternary tallowamines, distearyldimethylammonium chloride or bromide, N-dodecylpyridine chloride or bromide, dimethyldioctadecyl ammonium bromide, and polyoxypropylene ethoxytrimethylammonium chloride or bromide.

Many cationic quaternary ammonium surfactants of diverse structures are known in the art to be useful and can be used in compositions contemplated herein. Suitable surface active agents (i.e., surfactants) also include emulsifying agents and wetting agents including both ionic and nonionic types such as polyacrylic acid salts, lignosulphonic acid salts, phenolsulphonic or naphthalenesulphonic acids, products of polycondensation of ethylene oxide with fatty alcohols, fatty acids or fatty amines, substituted phenols (especially alkylphenol ethoxylates, or arylphenol ethoxylates), sulphonosuccinic acid ester salts, taurine derivatives (especially alkyl taurates), phosphoric esters of alcohols or products of polycondensation of ethylene oxide with phenols, esters of fatty acids with polyhydric alcohols, and derivatives having sulphate, sulphonate and phosphate groups, of the compounds above.

Additives

The composition of the present invention may also comprise one or more additives including one or more secondary rubber components, thermoplastics, fillers, curative systems, other additives, and the like. Additives are defined as components which alter physical properties of the inventive composition.

Secondary Rubber Component

The composition of the present invention may also comprise one or more secondary rubber, or "general purpose rubber" component(s) in the composition and/or an end use article comprising the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and mixtures thereof.

A desirable embodiment of the secondary rubber component present is natural rubber. Natural rubbers are described in detail by Subramaniam in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™® (Goodyear Chemical Company), arid BUDENE™® 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE® 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON® (ExxonMobil Chemical Company, Houston Tex.).

In one embodiment of the invention, a so called semi-crystalline copolymer ("SCC") is present as the secondary "rubber" component. Semi-crystalline copolymers are described in WO00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the nanocomposite composition, when present, may be present in a range from 1 up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 10 phr in yet another embodiment, and from at least 20 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Fillers

The composition of the invention may also include one or more filler components such as calcium carbonate, clay, mica, silica and silicates, talc, titanium dioxide, and carbon black. In one embodiment, the filler is carbon black or modified carbon black. The preferred filler is semi-reinforcing grade carbon black present at a level of from 10 to 150 phr in the nanocomposite composition, more preferably from 30 to 120 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Embodiments of the carbon black useful in, for example, innerliners for tires are N550, N650, N660, N762, and N990.

Curative Systems

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more accelerators or vulcanizing agents. The composition may also be cured using ultraviolet light or electron irradiation.

In another embodiment of the invention, improved impermeability of the composition is achieved by the presence of at least one polyfunctional curative. An embodiment of such polyfunctional curatives can be described by the formula Z-$R^7$-Z', wherein $R^7$ is one of a $C_1$ to $C_1$5 alkyl, $C_2$ to $C_1$5 alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds. Non-limiting examples of such polyfunctional curatives include hexamethylene bis(sodium thiosulfate) and hexamethylene bis(cinnamaldehyde), and others as are well known in the rubber compounding arts. These and other suitable agents are disclosed in, for example, the BLUE BOOK, MATERIALS, COMPOUNDING INGREDIENTS, MACHINERY AND SERVICES FOR RUBBER (Don. R. Smith, ed., Lippincott & Petto Inc. 2001). The polyfunctional curative, if present, may be present in the composition from 0.1 to 8 phr in one embodiment, and from 0.2 to 5 phr in yet another embodiment.

Suitable accelerators and/or vulcanizing agents include amines, guanidines, thioureas, thiazoles, thiurams, sulfenamides, sulfenimides, thiocarbamates, xanthates, and the like. Examples of such accelerators and vulcanizing agents include di-ortho-tolylguanidine salt of dicatechol borate, m-phenylene bis maleimide, 2,4,6-trimercapto-5 triazine, zinc diethyl dithiocarbamate, and other dithiocarbamates, dipenta-methylene thiuram hexasulfide, alkylated phenol disulfide, phenol formaldehyde resin, brominated alkyl phenol formaldehyde resin, diphenyl phenylene diamine, salicyclic acid (o-hydroxy benzoic acid), wood rosin (abietic acid), and tetramethyl thiuram disulfide in combination with sulfur, stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), and N,N'-diethyl thiourea.

Acceleration of the cure process may be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks which join together two or more polymer chains and enhance the overall strength of the polymer matrix.

In one embodiment of the invention, at least one curing agent is present from 0.2 to 15 phr, and from 0.5 to 10 phr in another embodiment. Curing agents include those components described above that facilitate or influence the cure of elastomers, such as metals, accelerators, sulfur, peroxides, and other agents common in the art, and as described above.

Other Additives

The compositions of the invention may also contain other conventional additives such as dyes, pigments, antioxidants, heat and light stabilizers, plasticizers, oils and other ingredients as known in the art.

Method of Producing

The method by which the inventive compositions are produce may include the following steps, wherein the steps are listed in no particular order unless specifically recited as such.

The components of the present composition are contacted with each other to form an intimate mixture, blend, composition, or the like of components. For ease of reference, such contacting is simply referred to herein as blending. Blending of the components may be carried out by combining the polymer components and the at least partially intercalated clay in any suitable mixing device such, as a Banbury® mixer, Brabender® mixer or preferably a mixer/extruder and mixing at temperatures in the range of 120° C. up to 300° C. under conditions of shear sufficient to allow the clay intercalate to become uniformly dispersed within the functionalized interpolymer to form the nanocomposite composition of the present invention.

In an embodiment, a process for preparing a nanocomposite composition comprises the steps of:
a) contacting the multifunctional intercalant comprising a cationic moiety separated from an anionic moiety by at least 1 carbon as described above, with a clay at a temperature and for a period of time sufficient to produce an at least partially intercalated clay; and
b) contacting the at least partially intercalated clay with a functionalized interpolymer as described above at a temperature, and for a period of time sufficient to produce the inventive nanocomposite composition.

In an embodiment, step a) contacting the multifunctional intercalant comprising a cationic moiety separated from an anionic moiety by at least 1 carbon as described above, with a clay is preferably preformed at a temperature of from 20 to 120° C., more preferably from 30 to 90° C., with 40 to 70° C. being more preferred.

Step a) is also preferably conducted for a period of time of 1 minute to 24 hours, preferably 0.5 to 8 hours (hrs.), with 1 to 4 hrs. being more preferred.

In an embodiment, step b) contacting the at least partially intercalated clay with a functionalized interpolymer as described above at a temperature, and for a period of time sufficient to produce the inventive nanocomposite composition, is preferably preformed at a temperature of from 40 to 140° C., more preferably from 60 to 120° C., with 80 to 100° C. being more preferred.

Step b) is also preferably conducted for a period of time of 1 minute to 24 hours, preferably 0.5 to 8 hrs., with 1 to 4 hrs. being more preferred.

In an embodiment, the contacting of the multifunctional intercalant with the clay recited in step (a) may be conducted at a pH wherein the cationic moiety of the multifunctional intercalant is positively charged. Accordingly, the contacting of the multifunctional intercalant with the clay is preferably conducted at an acidic pH (i.e., pH less than 7.) Thus addition of an acid may be included in step (a) wherein the contacting of the multifunctional intercalant with the clay occurs. A preferred pH for contacting the multifunctional intercalant with the clay is a pH of 6 or less, preferably 5 or less, preferably 4 or less, preferably 3 or less, preferably 2 or less, preferably 1 or less. Preferred acids include both Bronsted acids and Lewis acids, including mineral acids (e.g., HCl, HBr, HI, and/or HF), sulfuric acid, sulfonic acids, sulfamic acids, phosphoric acids, phosphorous acids, combinations thereof, and the like.

The multifunctional intercalant is contacted with the clay at a temperature and for a period of time sufficient to allow at least a portion of the cationic moiety of the multifunctional intercalant to exchange with sites on the clay. The multifunctional intercalant may be first at least partially dissolved in a solvent, such as water, an organic solvent, or a combination thereof, where it may then be combined with an acid an mixed. One particularly preferred class of solvents includes low molecular weight alcohols (e.g., ($C_1$-$C_6$ alcohols, preferably methanol (MeOH), ethanol (EtOH), isopropanol (iPrOH), propanol (PrOH), and butanol (BuOH.) The acidified multifunctional intercalant mixture or solution thereof may also be heated as necessary to insure a charged cationic moiety is present (e.g., to protonate the amine functionality of the multifunctional intercalant.)

A second modifier in the form of a surfactant may also be added to the multifunctional intercalant solution or mixture either prior to addition of the clay, along with the addition of the clay, or after addition of the clay. In an embodiment, a surfactant, preferably a neutral or a cationic surfactant, most preferably a cationic surfactant is added to the multifunctional intercalant solution (and/or mixture) along with or subsequent to the acid, but preferably before addition of the clay. The mixture may then be heated, mixed, shaken, or the like to produce an intimate mixture of the multifunctional intercalant, the acid and the second modifier.

The second modifier (the intercalation modifier, e.g., the surfactant) is preferably present in the mixture at or above the critical micelle concentration of the particular surfactant or surfactants in the particular solution. The multifunctional intercalant solution may then be combined with the clay, preferably a Na+ form clay such as Cloisite Na+. The clay may first be slurried in a solvent such as water, an alcohol, an organic solvent, or a combination thereof prior to being contacted with the multifunctional intercalant. The combined multifunctional intercalant, clay, and optional solvent(s), acid(s) and second modifier(s) may then be blended and/or heated for a period of time sufficient to produce an at least partially intercalated clay, also referred to herein as an at least partially exfoliated clay. In another embodiment, the intercalation modifier is present in the nanocomposite composition at greater than 0.1 wt %, preferably at greater than 0.5 wt %, with greater than 1 wt % being more preferred.

The at least partially intercalated clay (the modified clay) may then be separated from the solvent, washed with a solvent and/or dried, and/or milled for subsequent addition to the functionalized interpolymer and optionally in combination with other additives.

The functionalized interpolymer may then be contacted with the at least partially intercalated clay. In an embodiment, the functionalized interpolymer may be at least partially dissolved in an appropriate solvent, and the modified clay added thereto. Preferred solvents include hydrocarbon solvent, including aliphatic hydrocarbons (e.g., pentane, hexane, and the like), aromatic solvents including benzene, toluene, xylene, and the like, and combinations thereof. The modified clay may be added as a solid, or in a slurry or other mixture along with a solvent. The modified clay and the functionalized interpolymer may then be contacted (e.g., mixed, blended, kneaded, and/or the like) for a period of time, and at a temperature sufficient to produce the inventive nanocomposite composition.

In a preferred embodiment, the modified clay and the functionalized interpolymer are blended for a period of time, and at a temperature sufficient to produce chemical bonds between the anionic moiety of the multifunctional intercalant, and the halogen substituents of the functionalized interpolymer. For example, a carboxylate functional group of the multifunctional intercalant may react with a halogen atom on a phenyl ring of the functionalized interpolymer to produce an ester linkage between the multifunctional intercalant and the functionalized interpolymer, and thus may form a linkage between the modified clay to which the cationic moiety of the multifunctional intercalant is attached and/or bonded to, and the functionalized interpolymer.

In a preferred embodiment, the at least partially intercalated clay and the functionalized interpolymer are blended for a period of time, at a temperature, and at a pH sufficient to produce the inventive nanocomposition. Preferably, the modified clay and the functionalized interpolymer are contacted at a pH of greater than 7, preferably greater than 8, preferably greater than 9, preferably greater than 10. As such, a basic material, such as NaOH, KOH, sodium carbonate, potassium carbonate, and/or the like, may be added to the step wherein the at least partially intercalated clay and the functionalized interpolymer are contacted. Other basic materials may also be used, including both Bronsted bases and/or Lewis bases.

One or more additives as defined herein may also be added to any one of the above steps. In a preferred embodiment, a curative, secondary rubber, filler, or other additive is added to the inventive composition during the process.

Embodiments by which the inventive composition is produced include methods comprising the steps of:
a) contacting the multifunctional intercalant comprising a cationic moiety separated from an anionic moiety by at least 1, preferably at least 4 carbons as described above, with a clay at a temperature and for a period of time sufficient to produce an at least partially intercalated clay;
b) dissolving at least a portion of the functionalized interpolymer, such as a random copolymer comprising a halogenated $C_4$ to $C_7$ isomonoolefin derived unit, in a solvent to produce a functionalized interpolymer mixture; and
c) contacting the at least partially intercalated clay with the functionalized interpolymer mixture at a temperature, and for a period of time sufficient to produce the inventive nanocomposite composition.

In an embodiment, step a) contacting the multifunctional intercalant comprising a cationic moiety separated from an anionic moiety by at least 1 carbon as described above, with a clay is preferably preformed at a temperature of from 20 to 120° C., more preferably from 30 to 90° C., with 40 to 70° C. being more preferred. Step a) is also preferably conducted for a period of time of 1 minute to 24 hours, preferably 0.5 to 8 hrs., with 1 to 4 hrs. being more preferred.

In an embodiment, step b) dissolving at least a portion of the functionalized interpolymer, such as a random copolymer comprising a halogenated $C_4$ to $C_7$ isomonoolefin derived unit, in a solvent to produce a functionalized interpolymer mixture; is preferably preformed at a temperature of from 0 to 250° C., more preferably from 25 to 100° C., with 35 to 70° C. being more preferred. Step b) is also preferably conducted for a period of time of 1 minute to 48 hours, preferably 0.5 to 24 hrs., with 1 to 8 hours being more preferred.

In an embodiment, step c) contacting the at least partially intercalated clay with a functionalized interpolymer as described above at a temperature, and for a period of time sufficient to produce the inventive nanocomposite composition, is preferably preformed at a temperature of from 20 to 120° C., more preferably from 30 to 90° C., with 40 to 70° C. being more preferred. Step c) is also preferably conducted for a period of time of 1 minute to 24 hours, preferably 0.5 to 8 hrs., with 1 to 4 hrs. being more preferred.

In another embodiment, the inventive composition is produced utilizing a method comprising the steps of:
a) contacting the multifunctional intercalant comprising a cationic moiety separated from an anionic moiety by at least 1 carbon as described above, with a clay at a sufficient temperature, for a period of time, and at an acidic pH sufficient to produce an at least partially intercalated clay;
b) dissolving at least a portion of the functionalized interpolymer, such as a functionalized interpolymer comprising a halogenated $C_4$ to $C_7$ isomonoolefin derived unit, in a solvent to produce a functionalized interpolymer mixture; and
c) contacting the at least partially intercalated clay with the functionalized interpolymer mixture at a temperature, and for a period of time sufficient to produce the inventive nanocomposite composition.

In another embodiment, the inventive composition is produced utilizing a method comprising the steps of:
a) contacting the multifunctional intercalant comprising a cationic moiety separated from an anionic moiety by at least 4 carbons as described above, with a clay in the presence of an anionic surfactant, a neutral surfactant, and/or a cationic surfactant, with a cationic surfactant being preferred, at a sufficient temperature, for a period of time, and at an acidic pH sufficient to produce an at least partially intercalated clay;
b) dissolving at least a portion of the functionalized interpolymer, such as a functionalized interpolymer comprising a halogenated $C_4$ to $C_7$ isomonoolefin derived unit, in a solvent to produce a functionalized interpolymer mixture; and
c) contacting the at least partially intercalated clay with the functionalized interpolymer mixture at a temperature, and for a period of time sufficient to produce the inventive nanocomposite composition.

In yet another embodiment, the inventive composition is produced utilizing a method comprising the steps of:
a) contacting the multifunctional intercalant comprising a cationic moiety separated from an anionic moiety by at least 4 carbons as described above, with a clay in the presence of an anionic surfactant, a neutral surfactant, and/or a cationic surfactant, with a cationic surfactant being preferred, at a sufficient temperature, for a period of time, and at an acidic pH sufficient to produce an at least partially intercalated clay;

b) dissolving at least a portion of the functionalized interpolymer, such as a functionalized interpolymer comprising a halogenated $C_4$ to $C_7$ isomonoolefin derived unit, in a solvent to produce a functionalized interpolymer mixture; and c) contacting the at least partially intercalated clay with the functionalized interpolymer mixture at a pH of greater than 7, at a temperature, and for a period of time sufficient to produce the inventive nanocomposite composition. Preferably wherein the anionic moiety of the multifunctional intercalant forms chemical linkages with the functionalized interpolymer, more preferably ester linkages between a carboxylate moiety of the multifunctional intercalant and the functionalized interpolymer, the ester linkages being formed via reaction at the sites of halogenation of the functionalized interpolymer.

Any of the above methods may also include steps comprising the addition of secondary rubber compounds, thermoplastics, fillers, pigments, curatives, and the like; and/or any of the above methods may include curing the composition, milling, mixing, blending, grinding, or otherwise processing the composition, and the like.

The composition of this invention may be extruded, compression molded, blow molded or, injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and/or inner tubes.

Nanocomposite Compositions

The compositions of the present invention are useful in air barriers such as bladders and innerliners, air sleeves (such as in air shocks), diaphragms, as well as other applications where high air or oxygen retention is desirable. In one embodiment, the cured composition has an oxygen transmission rate (also referred to herein as an air permeability) of less than 100 mm-cc/m2 day at 40° C. Preferably, the oxygen transmission is less than 99, preferably less than 98, preferably less than 97, preferably less than 96, preferably less than 95, preferably less than 94, preferably less than 93, preferably less than 92, preferably less than 91, preferably less than 90, preferably less than 89, preferably less than 88, preferably less than 87, preferably less than 86, preferably less than 85 mm-cc/m2 day at 40° C.

The at least partially intercalated clays and the nanocompositions of the present invention comprise a level of exfoliation of the modified clay as determined by X-ray diffraction. X-ray diffraction of the samples may be determined according to the d-spacing of the clay and/or the nanocomposite composition. Accordingly, The distance between the layers of the clay is the so-called "d100 d-spacing". A d-spacing (d100) of greater then 20 Angstroms being indicative of an exfoliated clay. In a preferred embodiment, the at least partially intercalated clay of the present invention has a d-spacing (d100) of greater than 20 Angstroms. Preferably, the d-spacing (d100) is greater than 30, preferably greater than 40, preferably greater than 50, preferably greater than 60, preferably greater than 68, preferably greater than 70, preferably greater than 80, with at least greater than 90 being more preferred.

In a preferred embodiment, both the cured and uncured nanocomposition of the present invention has a d-spacing (d100) of greater than 20 Angstroms. Preferably, the d-spacing (d100) is greater than 30, preferably greater than 40, preferably greater than 50, preferably greater than 60, preferably greater than 68, preferably greater than 70, preferably greater than 80, with at least greater than 90 being more preferred.

Test Methods

Oxygen transmission rate was measured using a MOCON OxTran Model 2/61 operating under the principle of dynamic measurement of oxygen transport through a thin film as published by R. A. Pasternak et al. in 8 JOURNAL OF POLYMER SCIENCE: PART A-2 467 (1970). The units of measure are mm·cc/m2 day. Generally, the method is as follows: flat film or rubber samples are clamped into diffusion cells which are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

Air permeability was tested by the following method. Thin, vulcanized test specimens from the sample compositions were mounted in diffusion cells and conditioned in an oil bath at 65° C. The time required for air to permeate through a given specimen is recorded to determine its air permeability. Test specimens were circular plates with 12.7-cm diameter and 0.38-mm thickness. The error (2σ) in measuring air permeability is ±0.245 (×108) units. Other test methods are described in Table 2.

Permeability Measurement:

Permeability testing proceeded according to the following description. All examples were compression molded with slow cooling to provide defect free pads. A compression and curing press was used for rubber samples. Typical thickness of a compression molded pad is around 0.38 mm using a Carver press, 2" diameter disks were then punched out from molded pads for permeability testing. These disks were conditioned in a vacuum oven at 60° C. overnight prior to the measurement. The oxygen permeation measurements were done using a Mocon OX-TRAN 2/61 permeability tester at 40° C. under the principle of R. A. Pasternak et. al. in Vol. 8 Journal of Polymer Science: Part A-2 467 (1970) as discussed above. Disks thus prepared were mounted on a template and sealed with vacuum grease. A steady flow of oxygen at 10 mL/min was maintained on one side of the disk, while a steady flow of nitrogen at 10 mL/min was maintained on the other side of the disk. Using the oxygen sensor on the nitrogen side, increase in oxygen concentration on the nitrogen side with time could be monitored. The time required for oxygen to permeate through the disk, or for oxygen concentration on the nitrogen side to reach a constant value, is recorded and used to determine the oxygen gas permeability.

X-ray Analysis

X-Ray testing proceeded according to the following description. X-ray data was collected on two different goniometer configurations. A D/MAX Rapid 2-dimensional detector microdiffraction system, with SAXS beam stop and point source was used for one set of data, and an Ultima III line source system with SAXS attachment in parallel beam mode was used for the second set of data. The intensity versus d-spacing plots shown in FIGS. 1-6 are from the parallel beam point source with SAXS attachment instrument. For this data, the sample was prepared by cutting various sections at different angles with respect to the sample surface in order to decrease effects of preferred orientation, and the parallel beam was used to illuminate the entire sample area.

Compounding Information

Useful formulations for property evaluation were conducted as follows:

| Material I.D. | Parts |
| --- | --- |
| Elastomer/Clay MB | 108.0 |
| | (100 parts of rubber and 8 parts of clay) |
| Carbon black N660 | 60.0 |
| Stearic Acid | 1.0 |
| ZnO Kadox 911 | 1.0 |
| MBTS | 1.0 |

Carbon black N660 was obtained from, e.g., Cabot Corp. (Billerica, Mass.). Stearic acid, a cure agent, was obtained from C. K. Witco Corp. (Taft, La.), Kadox 911, an activator, was obtained from C. P. Hall (Chicago, Ill.). MBTS, 2-mercaptobenzothiazole disulfide, was obtained from R. T. Vanderbilt (Norwalk, Conn.) or Elastochem (Chardon, Ohio).

EXAMPLES

In the following examples, an at least partially intercalated clay was prepared, which was then combined with various functionalized interpolymers as described below. The compositions were cured, milled, and pressed into samples. The permeation rate and d-spacing were then determined.

| Components | | |
| --- | --- | --- |
| | Description | Available from |
| Clay | | |
| Cloisite Na+ | natural montmorillonite | Southern Clay Products Gonzales, Texas |
| Rubber | | |
| MDX 03-01 | | ExxonMobil |
| Curatives | | |
| Kadox 911 | Activator | C. P. Hall (Chicago, IL) |
| MBTS | 2-mercaptobenzothiazole disulfide | R. T. Vanderbilt (Norwalk, CT) |
| Stearic acid | Cure agent | C. K. Witco Corp.(Taft, LA) |
| Fillers | | |
| N660 | Carbon Black | Cabot Corp. (Billerica, MA). |

Formation of the at Least Partially Intercalated Clay

Methanol (700 ml) was added to a glass reactor at room temperature (~25° C.) To the same reactor were added a multifunctional intercalant (Modifier I) and a 0.5N $HCl$ solution according to Table 1. The mixture was stirred for 3 hrs. The solution was heated to 60° C. and a surfactant (Modifier II) was added according to Table 1. After stirring for 15 minutes, Cloisite Na+ in the amount specified in Table 1 was added and reacted for 4 hours. The resulting solution was collected in a flask. The modified clay was filtered and dried under vacuum overnight at 90° C. This modified clay was further used in examples 5-8.

TABLE 1

| Example | Clay | Modifier I | Modifier II | 0.5N HCl | d-spacing (Å) |
| --- | --- | --- | --- | --- | --- |
| 1 | Cloisite Na+ (30 g) | 12-aminododecanoic acid (5.94 g) | N/A | 55.2 ml | 69 |
| 2 | Cloisite Na+ (30 g) | 12-aminododecanoic acid (2.37 g) | Dimethyldioctadecyl-ammonium bromide (10.5 g) | 22.08 ml | 78 |
| 3 | Cloisite Na+ (30 g) | 4-dimethylamino benzoic acid (3.84 g) | N/A | 55.2 ml | 40.2 |
| 4 | Cloisite Na+ (30 g) | 12-aminododecanoic acid (1.54 g) | Dimethyldioctadecyl-ammonium bromide (10.5 g) | 22.08 ml | 70.36 |
| Comparative Example 1 | Cloisite Na+ | N/A | N/A | N/A | 11.7 |

Next the modified clay was contacted with the functionalized interpolymer to produce the inventive composition as follows:

80 g of the functionalized interpolymer (MDX 03-01) was added to a reactor at 90° C., containing 600 ml xylene. After all polymer was dissolved, 200 ml of butyl alcohol and the modified clay was added. Then, 0.3 ml of (0.5N) NaOH in ethyl alcohol was added, and the mixture stirred for 3 hours. The product was then poured out, and the solvent was evaporated. The product was further dried under vacuum overnight at 90° C. and then was milled at 130° C. for 15 minutes. The inventive composition (36 g) was loaded into a Brabender mixer at 150° C. and 60 rpm. After mixing for one minute, carbon black (N660, 20 g) was added and mixed for 7 minutes. The obtained carbon black/rubber mixture was then re-loaded into the Brabender at 40° C. After mixing for one minute, the curatives (Kadox 911: 0.33 g, MBTS 0.33 g and Stearic acid: 0.33 g) were added and mixed for 3 minutes. The compounded sample was then milled and pressed for duplicate permeation measurements. The data are shown in Table 2.

TABLE 2

| Example | Functionalized interpolymer MDX 03-01 (g) | Modified Clay (6.4 g) | Permeation Rate (mm-cc/m²-day @ 40° C.) | d-spacing (Å) |
|---|---|---|---|---|
| 5 | MDX 03-01 (80 g) | Example 1 | 86.330 86.800 | 66.13 |
| 6 | MDX 03-01 (80 g) | Example 2 | 91.330 90.430 | 88.34 |
| 7 | MDX 03-01 (80 g) | Example 3 | 91.100 94.400 | 82.7 |
| 8 | MDX 03-01 (80 g) | Example 4 | 88.600 87.700 | 85.2 |
| Comparative Example 2 | MDX 03-01 (80 g) | Comparative Example 1 | 115.75 115.32 | 11.7 |

Clays were modified as shown in Table 3, Examples 9-16.

Methanol (600 ml) was added to a glass reactor and heated to 60° C. To the same reactor was added Cloisite Na+ (30 g). At the same time, Modifier I was dissolved in 150 ml of methanol and mixed with HCl to a pH of less than 3 by shaking the mixture for an hour. Modifier II was also added to the solution and the mixture was shaken for another half an hour. The solution of modifiers was added to a glass reactor containing a mixture of Cloisite NA+ in methanol (600 mL) and the mixture was stirred for 4 hours at 60° C. Finally, the solution was filtered and the modified clay was washed with ethanol twice and methanol twice. After drying under vacuum overnight at 80° C., exchanged clay was milled into fine powder. The modified clays of Examples 9-15 and Comparative Example 3, described in Table 3 were used in examples 17-23, Comparative Example 4, 25-31, and Comparative Example 5.

TABLE 3

| Example | Clay Cloisite Na+ (g) | Modifier I 4-dimethylamino benzoic acid (g) | Modifier II Dimethyldioctadecyl-ammonium bromide (g) | 0.5N HCL (ml) |
|---|---|---|---|---|
| 9 | 30 | 3.84 | N/A | 55.2 |
| 10 | 30 | 2.80 | 2.92 | 46 |
| 11 | 30 | 2.56 | 4.94 | 36.8 |
| 12 | 30 | 1.92 | 7.86 | 27.6 |
| 13 | 30 | 1.28 | 10.78 | 18.4 |
| 14 | 30 | 0.64 | 13.70 | 9.2 |
| Comparative Example 3 | 30 | N/A | 16.62 | N/A |
| 15 | 30 | 1.28 | 16.62 | 18.4 |

The functionalized interpolymer was loaded into Brabender at 150° C. and mixed for one minute. The modified clay was then slowly added and mixed with the polymer for 10 minutes at 160° C. In the next step, 36 g of the rubber/clay mixture is added to the Brabender at 150° C. and mixed for one minute. 20 g of carbon black (N660) were then added and mixed for an additional 7 minutes. All the material containing carbon black was re-loaded in the Brabender at 40° C. and mixed with curatives (Kadox 911: 0.33 g, MBTS 0.33 g and Stearic acid: 0.33 g). The compounded samples were then pressed and cured for permeation measurement as described herein. The data is shown in Table 4.

TABLE 4

| Example | MDX 03-01 (g) | Modified Clay Example # (3.6 g) | Permeation Rate (mm-cc/m²-day @ 40° C.) |
|---|---|---|---|
| 17 | 45 | Example 9 | 87.6 88.12 |
| 18 | 45 | Example 10 | 86.07 85.16 |
| 19 | 45 | Example 11 | 87.9 90.1 |
| 20 | 45 | Example 12 | 87.80 89.5 |
| 21 | 45 | Example 13 | 93.8 93.0 |
| 22 | 45 | Example 14 | 104.2 95.9 |
| Comparative Example 4 | 45 | Comparative Example 3 | 101.00 100.80 |
| 23 | 45 | Example 15 | 93.70 94.50 |

In the sample listed in Table 5, the functionalized interpolymer was pre-dissolved in toluene (500 ml). The solution was transferred into a rector at 70° C. 4.4 g of the listed modified clay was then added to the solution along with 30 ml ethanol. The mixture was stirred for 3 hours at 60° C. The solution was poured out and solvent evaporated. The rubber-clay mixture was further dried under vacuum at 80° C. 36 g of the rubber/clay mixture was added to the Brabender at 150° C. and mixed for one minute, then 20 g of carbon black (N660) were added and mixed for an additional 7 minutes at 60 rpm. Finally the obtained mixture is mixed with curatives (Kadox 911: 0.33 g, MBTS 0.33 g and Stearic acid: 0.33 g) at 40° C. The compounded sample was pressed and cured for permeation measurements as detailed in Table 5.

TABLE 5

| Example | MDX 03-01 (g) | Modified Clay Example # (3.6 g) | Permeation Rate (mm-cc/m²-day @ 40° C.) |
|---|---|---|---|
| 25 | 55 | Example 9 | 93.4 |
|  |  |  | 92.7 |
| 26 | 55 | Example 10 | 83.7 |
|  |  |  | 79.80 |
| 27 | 55 | Example 11 | 82.70 |
|  |  |  | 83.50 |
| 28 | 55 | Example 12 | 85.50 |
|  |  |  | 89.30 |
| 29 | 55 | Example 13 | 99.30 |
|  |  |  | 97.60 |
| 30 | 55 | Example 14 | 98.20 |
|  |  |  | 93.80 |
| Comparative Example 5 | 55 | Comparative Example 3 | 100.93 |
|  |  |  | 98.70 |
| 31 | 55 | Example 15 | 91.60 |
|  |  |  | 94.20 |

Embodiments of the final nanocomposite of the present invention are useful as air barriers, such as used in producing innerliners, or innertubes for motor vehicle tires, or hoses for motor vehicles. In particular, the nanocomposites are useful in innerliners in articles such as truck tires, bus tires, passenger automobile, motorcycle tires, off the road tires, and the like. The improved heat aging resistance of the present innerliner composition makes it particularly suited for use in truck tires to increase the retreading capability of the tire.

Accordingly, embodiments of the present invention include:

1a. A process for preparing a nanocomposite composition, comprising the steps of:
  contacting a multifunctional intercalant comprising a cationic moiety separated from an anionic moiety by at least 1 carbon, with a clay at a temperature and for a period of time sufficient to produce an at least partially intercalated clay; and
  contacting the at least partially intercalated clay with a functionalized interpolymer comprising one or more functional groups, at a temperature, and for a period of time sufficient to produce the nanocomposite composition.

2a. The process of 1a, wherein the functionalized interpolymer comprises a random elastomeric copolymer comprising $C_2$-$C_8$ olefin monomer, alkylstyrene monomer, and functionalized alkylstyrene monomer.

3a. The process of 2a, wherein the $C_2$-$C_8$ olefin monomer comprises ethylene, a $C_4$ to $C_7$ isomonoolefin, a $C_3$-$C_6$ alpha olefin, or a combination thereof.

4a. The process of 2a, wherein the $C_4$ to $C_7$ isomonoolefin comprises isobutylene.

5a. The process of 2a, wherein at least 80 wt % of the alkylstyrene monomer is a para-alkylstyrene monomer.

6a. The process of 2a, wherein the functionalized alkylstyrene monomer comprises a benzylic functional group selected from the group consisting of: halogen, carboxylic acid; carboxy salt; carboxy esters, amide, imide, hydroxy; alkoxide; phenoxide; thiolate; thioether; xanthate; cyanide; cyanate; isocyanide, amino, and a combination thereof.

7a. The process of 2a, wherein the functionalized alkylstyrene monomer comprises para-bromomethyl styrene.

8a. The process of 2a, wherein the alkylstyrene monomer comprises para-methylstyrene.

9a. The process of any one of 1a to 8a, wherein the functionalized interpolymer comprises 3 to 15 wt % para-methyl styrene.

10a. The process of any one of 1a to 9a, wherein the functionalized interpolymer comprises up to 15 mol % functionalized alkylstyrene monomer.

11a. The process of any one of 1a to 10a, wherein the functionalized interpolymer comprises 0.1 to 10 mol % para-bromomethyl styrene monomer.

12a. The process of any one of 1a to 11a, wherein at least 95 wt % of the functionalized interpolymer has a para-alkylstyrene content within 10% of the average para-alkylstyrene content of the functionalized interpolymer.

13a. The process of any one of 1a to 12a, wherein the functionalized interpolymer comprises a halogenated rubber component selected from the group consisting of: brominated butyl rubber, chlorinated butyl rubber, star-branched polyisobutylene rubber, star-branched brominated butyl rubber; isobutylene/meta-bromomethylstyrene rubber, isobutylene/para-bromomethylstyrene rubber, isobutylene/chloromethylstyrene rubber, halogenated isobutylene cyclopentadiene rubber, isobutylene/para-chloromethylstyrene rubber, polychloroprene rubber, and combinations thereof.

14a. The process of any one of 1a to 13a, wherein the clay comprises a natural phyllosilicate clay, a synthetic phyllosilicate clay, or a combination thereof.

15a. The process of any one of 1a to 14a, wherein the clay comprises a smectic clay.

16a. The process of any one of 1a to 15a, wherein the clay is selected from the group consisting of montmorillonite, nontronite, beidellite, volkonskoite, laponite, hectorite, saponite, sauconite, magadite, kenyaite, stevensite, vermiculite, halloysite, aluminate oxides, hydrotalcite, and combinations thereof.

17a. The process of any one of 1a to 16a, wherein the clay comprises particles having a plurality of silicate platelets of a thickness of 0.8-1.2 nanometers, and exchangeable cations selected from the group consisting of Na$^+$; Ca$^{+2}$, K$^+$ and Mg$^{+2}$, present at an interlayer surface of the silicate platelets.

18a. The process of any one of 1a to 17a, wherein the nanocomposite composition comprises 0.5 to 10 wt % clay.

19a. The process of any one of 1a to 18a, wherein the multifunctional intercalant is represented by the formula:

$$(CM)_n\text{-}R^1\text{-}(AM)_m,$$

wherein:
  CM is a cationic moiety;
  $R^1$ comprises at least 1 carbon atom;
  AM is an anionic moiety; and
  n and m are each greater than or equal to 1.

20a. The process of 19a, wherein the cationic moiety is an ammonium ion, a phosphonium ion, or a cation derived from one or more of a phosphine, an alkyl sulfide, an aryl sulfide, or a thiol.

21a. The process 19a, wherein the multifunctional intercalant is represented by the structure $R^2R^3N\text{---}R^1$-AM, or $R^2R^3R^4N+\text{---}R^1$-AM, wherein $R^1$ is a $C_1$ to $C_{50}$ hydrocarbyl, substituted hydrocarbyl, halocarbyl, or substituted halocarbyl; and wherein $R^2$, $R^3$, and $R^4$ when present, are each independently, hydrogen, $C_1$ to $C_{30}$ hydrocarbyls, substituted hydrocarbyls, halocarbyls, or substituted halocarbyls.

22a. The process of 21a, wherein $R^2$ and $R^3$ are methyl or ethyl, $R^4$ is hydrogen, and $R^1$ is a $C_8$-$C_{12}$ aliphatic alkyl or substituted aliphatic alkyl.

23a. The process of 21a, wherein $R^2$ and $R^3$ are methyl or ethyl, $R^4$ is hydrogen, and $R^1$ is a $C_6$-$C_{10}$ aromatic group or a substituted aromatic group.

24a. The process of any one of 19a to 23a, wherein $R^1$ comprises at least 4 carbon atoms.

25a. The process of any one of 19a to 24a, wherein $R^1$ comprises at least 11 carbon atoms.

26a. The process of any one of 19a to 25a, wherein $R^1$ comprises 10 to 12 carbon atoms.

27a. The process of any one of 19a to 26a, wherein $R^1$ is a $C_{14}$ to $C_{20}$ alkyl or alkene.

28a. The process of any one of 19a, wherein the anionic moiety is a carboxylic acid; a carboxy salt; a carboxy ester, an amide, an imide; a hydroxy; an alkoxide; a phenoxide; a thiolate; a thioether; a xanthate; a cyanide; a cyanate; a phosphate; a phosphite; a sulfate; a sulfite; or a combination thereof.

29a. The process of any one of 19a, wherein the anionic moiety is a carboxylate anion.

30a. The process of any one of 1a to 29a, wherein the multifunctional intercalant is selected from the group consisting of: 12-aminododecanoic acid, N-substituted 12-aminododecanoic acid, N,N-disubstituted 12-aminododecanoic acid, and N,N,N-trisubstituted 12-aminododecanoic acid, wherein the N-substituents are $C_1$-$C_{12}$ alkyl groups, alanine, arginine, asparagines, aspartic acid, cysteine, glutamine, glutamic acid, glycine, histidine, isoleucine, leucine, lysine, methionine, phenylalanine, proline, serine, threonine, tryptophan, tyrosine, valine, aspartic acid, and glutamic acid.

31a. The process of any one of 1a to 30a, wherein the multifunctional intercalant is epsilon-caprolactam, aminobenzoic acid, or a $C_1$-$C_{10}$ alkyl substituted aminobenzoic acid.

32a. The process of any one of 1a to 31a, wherein the multifunctional intercalant is dimethylaminobenzoic acid.

33a. The process of any one of 1a to 32a, wherein the clay is further contacted with an additional intercalant selected from the group consisting of:

polysilanes of the structure —Si($R^5$)$_2$$R^6$ where $R^5$ is the same or different at each occurrence and is selected from alkyl, alkoxy or oxysilane and $R^6$ is an organic radical;

primary, secondary, or tertiary amines; primary, secondary, or tertiary phosphines; alkyl sulfides; aryl sulfides; alkyl thiols; aryl thiols: and their polyfunctional analogs.

34a. The process of any one of 1a to 33a, wherein the clay is further contacted with an additional intercalant selected from the group consisting of:

N,N-dimethyl-octadecylamine, N,N-dioctadecyl-methylamine, dihydrogenated tallowalkyl-methylamine, amine-terminated polytetrahydrofuran, hexamethylene sodium thiosulfate, and a combination thereof.

35a. The process of any one of 1a to 34a, wherein the multifunctional intercalant is present in the nanocomposite composition at 0.1 to 20 phr.

36a. The process of any one of 1a to 35a, wherein the at least partially intercalated clay comprises layered platelets spaced at a distance of greater than 0.4 nm.

37a. The process of any one of 1a to 36a, further comprising the step of contacting the multifunctional intercalant with the clay in the presence of an intercalation modifier, and/or the step of contacting the at least partially intercalated clay with the functionalized interpolymer in the presence of an intercalation modifier, wherein the intercalation modifier is a surfactant, a block copolymer, a wetting agent, an emulsifying agent, or a combination thereof, and wherein the intercalation modifier is present in the nanocomposite composition at greater than or equal to 0.1 wt %.

38a. The process of 37a, wherein the intercalation modifier comprises a non-ionic surfactant, an anionic surfactant, an amphoteric surfactant, a cationic surfactant, or a combination thereof.

39a. The process of 37a, wherein the intercalation modifier comprises a cationic surfactant selected from the group consisting of:

polyoxyethylene and/or polyoxypropylene tertiary $C_1$-$C_{18}$ alkylamines, $C_1$-$C_{18}$ substituted tertiary alkylamines, $C_1$-$C_{18}$ substituted tertiary alkenylamines, ethoxylated and/or propoxylated fatty amines, $C_1$-$C_{18}$ alkyl-substituted fatty amines, polyoxyethylene and/or polyoxypropylene $C_1$-$C_{18}$ alkyletheramines, polyoxyethylene and/or polyoxypropylene cocoamines, polyoxyethylene and/or polyoxypropylene tallowamines, polyoxyethylene and/or polyoxypropylene quaternary tallowamines, distearyldimethylammonium chloride or bromide, N-dodecylpyridine chloride or bromide, dimethyldioctadecyl ammonium bromide, and polyoxypropylene ethoxytrimethylammonium chloride or bromide.

40a. The process of 37a, wherein the intercalation modifier comprises a surface active agent selected from the group consisting of:

polyacrylic acid salts, lignosulphonic acid salts, phenolsulphonic acids, naphthalenesulphonic acids, alkylphenol ethoxylates, arylphenol ethoxylates, sulphonosuccinic acid ester salts, alkyl taurates, phosphoric esters of alcohols, and derivatives having sulphate, sulphonate or phosphate groups of the above surface active agents.

41a. The process of any one of 1a to 40a, further comprising the step of adding one or more additives, wherein the additives comprise a secondary rubber component, a filler, a curative system, a dye, a pigment, an antioxidant, a heat stabilizer, a light stabilizer, a plasticizer, an oil, or a combination thereof.

42a. The process of 41a, wherein the secondary rubber component comprises natural rubber, polyisoprene rubber, poly(styrene-co-butadiene) rubber, polybutadiene rubber, poly(isoprene-co-butadiene) rubber, styrene-isoprene-butadiene rubber, ethylene-propylene rubber, ethylene-propylene-diene rubber, polysulfide rubber, nitrile rubber, propylene oxide rubber polymers, star-branched butyl rubber, and mixtures thereof.

43a. The process of any one of 41a or 42a, wherein the secondary rubber component is present in the nanocomposite composition at 1 to 90 phr.

44a. The process of any one of 1a to 43a, further comprising adding a filler comprising calcium carbonate, clay, mica, silica, a silicate, talc, titanium dioxide, carbon black, or a combination thereof.

45a. The process of any one of 1a to 44a, wherein the filler is carbon black or a modified carbon black.

46a. The process of any one of 1a to 45a, wherein the filler is semi-reinforcing grade carbon black present at a level of from 10 to 150 phr in the nanocomposite composition.

47a. The process of 41a, wherein the curative system comprises a polyfunctional curatives described by the formula Z-$R^7$-Z', wherein $R^7$ is one of a $C_1$ to $C_{15}$ alkyl, a $C_2$ to $C_{15}$ alkenyl, or a $C_6$ to $C_{12}$ cyclic aromatic moiety, substituted or unsubstituted; and Z and Z' are the same or different and are one of a thiosulfate group, a mercapto group, an aldehyde group, a carboxylic acid group, a peroxide group, an alkenyl group, or a combination thereof.

48a. The process of 41a, wherein the curative system comprises hexamethylene bis(sodium thiosulfate), hexamethylene bis(cinnamaldehyde), or a combination thereof.

49a. The process of 47a, wherein the polyfunctional curative system is present in the nanocomposite composition at 0.1 to 8 phr.

50a. The process of 41a, wherein the curative system comprises di-ortho-tolylguanidine salt of dicatechol borate, m-phenylene bis maleimide, 2,4,6-trimercapto-5 triazine, zinc diethyl dithiocarbamate, dipenta-methylene thiuram hexasulfide, alkylated phenol disulfide, phenol formaldehyde resin, brominated alkyl phenol formaldehyde resin, diphenyl phenylene diamine, salicyclic acid, wood rosin, tetramethyl thiuram disulfide in combination with sulfur, stearic acid, diphenyl guanidine, tetramethylthiuram disulfide, 4,4'-dithiodimorpholine, tetrabutylthiuram disulfide, 2,2'-benzothiazyl, N-tertiarybutyl-2-benzothiazole sulfenamide, N-oxydiethylene thiocarbamyl-N-oxydiethylene sulfonamide, zinc 2-ethyl hexanoate, N,N'-diethyl thiourea, or a combination thereof.

51a. The process of 41a, wherein the curative system is added to the nanocomposite composition in an amount equal to 0.2 to 15 phr.

52a. The process of any one of 1a to 51a, wherein the multifunctional intercalant is contacted with the clay at a temperature of 20° C. to 120° C., for a period of time of 1 minute to 24 hours.

53a. The process of any one of 1a to 52a, wherein the intercalated clay is contacted with the functional interpolymer at a temperature of 40° C. to 140° C., for a period of time of 1 minute to 24 hours.

54a. The process of any one of 1a to 53a, wherein the multifunctional intercalant is contacted with the clay in the presence of an acid such that the pH of the mixture of the multifunctional intercalant and the clay is below 7.

55a. The process of 54a, wherein the acid is selected from the group consisting of HCl, HBr, HI, HF, phosphoric acid, phosphorous acid, sulfuric acid, or a combination thereof.

56a. The process of any one of 1a to 55a, wherein the intercalated clay is contacted with the functional interpolymer in the presence of a base such that the pH of the mixture of the intercalated clay and the functional interpolymer is above 7.

57a. The process of 56a, wherein the base is NaOH or KOH.

58a. A process for preparing a nanocomposite composition, comprising the steps of:
  contacting a multifunctional intercalant comprising a cationic moiety separated from an anionic moiety by at least 1 carbon, with a clay at a temperature, at an acidic pH, and for a period of time sufficient to produce a chemical bond and/or physical interaction between the cationic moiety of the multifunctional intercalant and the clay, to produce an at least partially intercalated clay; and
  contacting the at least partially intercalated clay with a functionalized interpolymer at a temperature, at a basic pH, and for a period of time sufficient to produce a chemical bond and/or physical interaction between the anionic moiety of the multifunctional intercalant and the functionalized interpolymer, to produce the nanocomposite composition.

59a. The process of 58a, wherein the cationic moiety of the multifunctional intercalant forms a linkage with the clay, and wherein the anionic moiety of the multifunctional intercalant forms an ester linkage with the functionalized interpolymer.

60a. The process of any one of 58a or 59a, wherein the multifunctional intercalant is contacted with the clay at a pH of less than 5.

61a. The process of any one of 58a to 60a, wherein the at least partially intercalated clay is contacted with the functionalized interpolymer at a pH of greater than 8.

62a. A process for preparing a nanocomposite composition, comprising the steps of:
  contacting a multifunctional intercalant comprising a cationic moiety separated from an anionic moiety by at least 1 carbon atom with a clay at a temperature and for a period of time sufficient to produce an at least partially intercalated clay;
  dissolving at least a portion of a functionalized interpolymer in a solvent to produce a functionalized interpolymer mixture; and
  contacting the at least partially intercalated clay with the functionalized interpolymer mixture at a temperature, and for a period of time sufficient to produce the nanocomposite composition.

63a. The process of 62a, wherein the cationic moiety of the multifunctional intercalant forms a linkage with the clay, and wherein the anionic moiety of the multifunctional intercalant forms an ester linkage with the functionalized interpolymer.

64a. A process for preparing a nanocomposite composition, comprising the steps of:
  contacting a multifunctional intercalant comprising a cationic moiety separated from an anionic moiety by at least 1 carbon atom with a clay at a temperature, for a period of time, and at an acidic pH sufficient to produce an at least partially intercalated clay;
  dissolving at least a portion of a functionalized interpolymer in a solvent to produce a functionalized interpolymer mixture; and
  contacting the at least partially intercalated clay with the functionalized interpolymer mixture at a temperature, and for a period of time sufficient to produce the nanocomposite composition.

65a. The process of 64a, wherein the cationic moiety of the multifunctional intercalant forms a linkage with the clay, and wherein the anionic moiety of the multifunctional intercalant forms an ester linkage with the functionalized interpolymer.

66a. A process for preparing a nanocomposite composition, comprising the steps of:
  contacting a multifunctional intercalant comprising a cationic moiety separated from an anionic moiety by at least 1 carbon with a clay in the presence of a cationic surfactant at a temperature, for a period of time, and at an acidic pH sufficient to produce an at least partially intercalated clay;
  dissolving at least a portion of a functionalized interpolymer in a solvent to produce a functionalized interpolymer mixture; and
  contacting the at least partially intercalated clay with the functionalized interpolymer mixture at a temperature, and for a period of time sufficient to produce the nanocomposite composition.

67a. The process of 66a, wherein the cationic moiety of the multifunctional intercalant forms a linkage with the clay, and wherein the anionic moiety of the multifunctional intercalant forms an ester linkage with the functionalized interpolymer.

68a. A process for preparing a nanocomposite composition, comprising the steps of:
  contacting a multifunctional intercalant comprising a cationic moiety separated from an anionic moiety by at least 1 carbon with a clay in the presence of a cationic surfactant at a temperature, for a period of time, and at an acidic pH sufficient to produce an at least partially intercalated clay;

dissolving at least a portion of a functionalized interpolymer in a solvent to produce a functionalized interpolymer mixture; and contacting the at least partially intercalated clay with the functionalized interpolymer mixture at a pH of greater than 7, at a temperature, and for a period of time sufficient to produce the nanocomposite composition.

69a. The process of 68a, wherein the cationic moiety of the multifunctional intercalant forms a linkage with the clay, and wherein the anionic moiety of the multifunctional intercalant forms an ester linkage with the functionalized interpolymer.

70a. The process of any one of 68a or 69a, further comprising the step of adding a secondary rubber component, a thermoplastic, a filler, a pigment, a curatives, or a combination thereof.

71a. The process of any one of 68a to 70a, further comprising the step of extruding, compression molding, blow molding, drying, solvent removal, grinding, milling, or mixing to produce the nanocomposite composition.

72a. An article comprising the nanocomposite composition of any one of 1a to 71a.

73a. The article of 72a, wherein the article is injection molded, a fiber, a film, an automotive part, an appliance housing, a consumer product, a packaging article, or a combination thereof.

74a. A tire interliner or a tire inner tube comprising the nanocomposite composition of any one of 1a to 71a.

75a. The process of any one of 1a to 71a, wherein the nanocomposite composition comprises an at least partially intercalated clay having a $d_{100}$ d-spacing determine using X-ray diffraction of greater than 20 Angstroms.

76a. The process of any one of 1a to 71a, wherein the nanocomposite composition comprises an at least partially intercalated clay having a $d_{100}$ d-spacing determine using X-ray diffraction of greater than 50 Angstroms.

77a. The process of any one of 1a to 71a, wherein the nanocomposite composition comprises an at least partially intercalated clay having a $d_{100}$ d-spacing determine using X-ray diffraction of greater than 60 Angstroms.

78a. The process of any one of 1a to 71a, further comprising the step of curing said nanocomposite composition to produce a cured nanocomposite composition.

79a. The process of 78a, wherein said cured nanocomposite composition has a d-spacing determine using X-ray diffraction of greater than 20 Angstroms.

80a. The process of any one of 78a or 79a, wherein said cured nanocomposite composition has an oxygen transmission rate of less than 100 mm-cc/m$^2$ day at 40° C.

81a. The process of any one of 78a to 80a, wherein said cured nanocomposite composition has an oxygen transmission rate of less than 90 mm-cc/m$^2$ day at 40° C.

82a. A process for preparing a nanocomposite composition as hereinbefore described with reference to the Examples.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

We claim:

1. A process for preparing a nanocomposite composition, comprising:
   a) contacting a multifunctional intercalant comprising a cationic moiety separated from an anionic moiety by at least 1 carbon atom and an intercalation modifier with a clay at a temperature and for a period of time sufficient to produce an at least partially intercalated clay;
   b) dissolving at least a portion of a functionalized interpolymer in a solvent to produce a functionalized interpolymer mixture wherein the functionalized interpolymer comprises $C_4$ to $C_7$ isoolefin derived units, multiolefin derived units and halogenated multiolefin derived units; and
   c) contacting the at least partially intercalated clay with the functionalized interpolymer mixture at a temperature, and for a period of time sufficient to produce the nanocomposite composition.

2. The process of claim 1, wherein the functionalized interpolymer comprises a random elastomeric copolymer comprising $C_2$-$C_8$ olefin monomer, alkylstyrene monomer, and functionalized alkylstyrene monomer.

3. The process of claim 2, wherein the $C_2$-$C_8$ olefin monomer comprises ethylene, a $C_4$ to $C_7$ isomonoolefin, a $C_3$-$C_6$ alpha olefin, or a combination thereof.

4. The process of claim 3, wherein the $C_4$ to $C_7$ isomonoolefin comprises isobutylene.

5. The process of claim 2, wherein at least 80 wt % of the alkylstyrene monomer is a para-alkylstyrene monomer.

6. The process of claim 2, wherein the functionalized alkylstyrene monomer comprises a benzylic functional group selected from the group consisting of: halogen, carboxylic acid; carboxy salt; carboxy esters, amide, imide, hydroxy; alkoxide; phenoxide; thiolate; thioether; xanthate; cyanide; cyanate; isocyanide, amino, and a combination thereof.

7. The process of claim 2, wherein the functionalized alkylstyrene monomer comprises para-bromomethyl styrene.

8. The process of claim 2, wherein the alkylstyrene monomer comprises para-methylstyrene.

9. The process of claim 2, wherein the functionalized interpolymer comprises 3 to 15 wt % para-methyl styrene.

10. The process of claim 2, wherein the functionalized interpolymer comprises up to 15 mol % of the functionalized alkylstyrene monomer.

11. The process of claim 2, wherein the functionalized interpolymer comprises 0.1 to 10 mol % para-bromomethyl styrene monomer.

12. The process of claim 2, wherein at least 95 wt % of the functionalized interpolymer has a para-alkylstyrene content within 10% of the average para-alkylstyrene content of the functionalized interpolymer.

13. The process of claim 1, wherein the functionalized interpolymer comprises a halogenated rubber component selected from the group consisting of: brominated butyl rubber, chlorinated butyl rubber, star-branched polyisobutylene rubber, star-branched brominated butyl rubber; isobutylene/meta-bromomethylstyrene rubber, isobutylene/para-bromomethylstyrene rubber, isobutylene/chloromethylstyrene rubber, halogenated isobutylene cyclopentadiene rubber, isobutylene/para-chloromethylstyrene rubber, polychloroprene rubber, and combinations thereof.

14. The process of claim 1, wherein the clay comprises a natural phyllosilicate clay, a synthetic phyllosilicate clay, or a combination thereof.

15. The process of claim 1, wherein the clay comprises a smectic clay.

16. The process of claim 1, wherein the clay is selected from the group consisting of montmorillonite, nontronite, beidellite, volkonskoite, laponite, hectorite, saponite, sauconite, magadite, kenyaite, stevensite, vermiculite, halloysite, aluminate oxides, hydrotalcite, and combinations thereof.

17. The process of claim 1, wherein the clay comprises particles having a plurality of silicate platelets of a thickness of 0.8-1.2 nanometers, and exchangeable cations selected from the group consisting of $Na^+$; $Ca^{+2}$, $K^+$ and $Mg^{+2}$, present at an interlayer surface of the silicate platelets.

18. The process of claim 1, wherein the nanocomposite composition comprises 0.5 to 10 wt % clay.

19. The process of claim 1, wherein the multifunctional intercalant is represented by the formula:

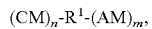

wherein:
CM is a cationic moiety;
$R^1$ comprises at least 1 carbon atom;
AM is an anionic moiety; and
n and m are each greater than or equal to 1.

20. The process of claim 19, wherein the cationic moiety is an ammonium ion, a phosphonium ion, or a cation derived from one or more of a phosphine, an alkyl sulfide, an aryl sulfide, or a thiol.

21. The process of claim 19, wherein the multifunctional intercalant is represented by the structure $R^2R^3N-R^1$-AM, or $R^2R^3R^4N+-R^1$-AM, wherein $R^1$ is a $C_1$ to $C_{50}$ hydrocarbyl, substituted hydrocarbyl, halocarbyl, or substituted halocarbyl; and wherein $R^2$, $R^3$, and $R^4$ when present, are each independently, hydrogen, $C_1$ to $C_{30}$ hydrocarbyls, substituted hydrocarbyls, halocarbyls, or substituted halocarbyls.

22. The process of claim 21, wherein $R^2$ and $R^3$ are methyl or ethyl, $R^4$ is hydrogen, and $R^1$ is a $C_8$-$C_{12}$ aliphatic alkyl or substituted aliphatic alkyl.

23. The process of claim 21, wherein $R^2$ and $R^3$ are methyl or ethyl, $R^4$ is hydrogen, and $R^1$ is a $C_6$-$C_{10}$ aromatic group or a substituted aromatic group.

24. The process of claim 19, wherein $R^1$ comprises at least 4 carbon atoms.

25. The process of claim 19, wherein $R^1$ comprises at least 11 carbon atoms.

26. The process of claim 19, wherein $R^1$ comprises 10 to 12 carbon atoms.

27. The process of claim 19, wherein $R^1$ is a $C_{14}$ to $C_{20}$ alkyl or alkene.

28. The process of claim 19, wherein the anionic moiety is derived from a carboxylic acid; a carboxy salt; a carboxy ester, an amide, an imide; a hydroxy; an alkoxide; a phenoxide; a thiolate; a thioether; a xanthate; a cyanide; a cyanate; a phosphate; a phosphite; a sulfate; a sulfite; or a combination thereof.

29. The process of claim 19, wherein the anionic moiety is a carboxylate anion.

30. The process of claim 1, wherein the multifunctional intercalant is selected from the group consisting of: 12-aminododecanoic acid, N-substituted 12-aminododecanoic acid, N,N-disubstituted 12-aminododecanoic acid, and N,N,N-trisubstituted 12-aminododecanoic acid, wherein the N-substituents are $C_1$-$C_{12}$ alkyl groups, alanine, arginine, asparagines, aspartic acid, cysteine, glutamine, glutamic acid, glycine, histidine, isoleucine, leucine, lysine, methionine, phenylalanine, proline, serine, threonine, tryptophan, tyrosine, valine, aspartic acid, and glutamic acid.

31. The process of claim 1, wherein the multifunctional intercalant is epsilon-caprolactam, aminobenzoic acid, or a $C_1$-$C_{10}$ alkyl substituted aminobenzoic acid.

32. The process of claim 1, wherein the multifunctional intercalant is dimethylaminobenzoic acid.

33. The process of claim 1, wherein the clay is further contacted with an additional intercalant selected from the group consisting of:
polysilanes of the structure $-Si(R^5)_2R^6$ where $R^5$ is the same or different at each occurrence and is selected from alkyl, alkoxy or oxysilane and $R^6$ is an organic radical;
primary, secondary, or tertiary amines; primary, secondary, or tertiary phosphines;
alkyl sulfides; aryl sulfides; alkyl thiols; aryl thiols: and their polyfunctional analogs.

34. The process of claim 1, wherein the clay is further contacted with an additional intercalant selected from the group consisting of:
N,N-dimethyl-octadecylamine, N,N-dioctadecyl-methylamine, dihydrogenated tallowalkyl-methylamine, amine-terminated polytetrahydrofuran, hexamethylene sodium thiosulfate, and a combination thereof.

35. The process of claim 1, wherein the multifunctional intercalant is present in the nanocomposite composition at 0.1 to 20 phr.

36. The process of claim 1, wherein the at least partially intercalated clay comprises layered platelets spaced at a distance of greater than 0.4 nm.

37. The process of claim 1, wherein the intercalation modifier is a surfactant, a block copolymer, a wetting agent, an emulsifying agent, or a combination thereof, and wherein the intercalation modifier is present in the nanocomposite composition at greater than or equal to 0.1 wt %.

38. The process of claim 37, wherein the intercalation modifier comprises a non-ionic surfactant, an anionic surfactant, an amphoteric surfactant, a cationic surfactant, or a combination thereof.

39. The process of claim 37, wherein the intercalation modifier comprises a cationic surfactant selected from the group consisting of:
polyoxyethylene tertiary $C_1$-$C_{18}$ alkylamines, polyoxypropylene tertiary $C_1$-$C_{18}$ alkylamines, $C_1$-$C_{18}$ substituted tertiary alkylamines, $C_1$-$C_{18}$ substituted tertiary alkenylamines, ethoxylated fatty amines, propoxylated fatty amines, $C_1$-$C_{18}$ alkyl-substituted fatty amines, polyoxyethylene $C_1$-$C_{18}$ alkyletheramines, polyoxypropylene $C_1$-$C_{18}$ alkyletheramines, polyoxyethylene cocoamines, polyoxypropylene cocoamines, polyoxyethylene tallowamines, polyoxypropylene tallowamines, polyoxyethylene quaternary tallowamines, polyoxypropylene quaternary tallowamines, distearyldimethylammonium chloride, distearyldimethylammonium bromide, N-dodecylpyridine chloride, N-dodecylpyridine bromide, dimethyldioctadecyl ammonium bromide, polyoxypropylene ethoxytrimethylammonium chloride, and polyoxypropylene ethoxytrimethylammonium bromide.

40. The process of claim 37, wherein the intercalation modifier comprises a surface active agent selected from the group consisting of:
polyacrylic acid salts, lignosulphonic acid salts, phenolsulphonic acids, naphthalenesulphonic acids, alkylphenol ethoxylates, arylphenol ethoxylates, sulphonosuccinic acid ester salts, alkyl taurates, phosphoric esters of alcohols, and derivatives of any of the above surface active agents having sulphate, sulphonate or phosphate groups.

41. The process of claim 1, further comprising the step of adding one or more additives, wherein the additives comprise a secondary rubber component, a filler, a curative system, a dye, a pigment, an antioxidant, a heat stabilizer, a light stabilizer, a plasticizer, an oil, or a combination thereof.

42. The process of claim 41, wherein the secondary rubber component comprises natural rubber, polyisoprene rubber, poly(styrene-co-butadiene) rubber, polybutadiene rubber, poly(isoprene-co-butadiene) rubber, styrene-isoprene-butadiene rubber, ethylene-propylene rubber, ethylene-propylene-diene rubber, polysulfide rubber, nitrile rubber, propylene oxide rubber polymers, star-branched butyl rubber, and mixtures thereof.

43. The process of claim 41, wherein the secondary rubber component is present in the nanocomposite composition at 1 to 90 phr.

44. The process of claim 41, wherein the filler is calcium carbonate, clay, mica, silica, a silicate, talc, titanium dioxide, carbon black, or a combination thereof.

45. The process of claim 41, wherein the filler is carbon black or a modified carbon black.

46. The process of claim 41, wherein the filler is semi-reinforcing grade carbon black present at a level of from 10 to 150 phr in the nanocomposite composition.

47. The process of claim 41, wherein the curative system comprises a polyfunctional curative system described by the formula Z-$R^7$-Z', wherein $R^7$ is one of a $C_1$ to $C_{15}$ alkyl, a $C_2$ to $C_{15}$ alkenyl, or a $C_6$ to $C_{12}$ cyclic aromatic moiety, substituted or unsubstituted; and Z and Z' are the same or different and are one of a thiosulfate group, a mercapto group, an aldehyde group, a carboxylic acid group, a peroxide group, an alkenyl group, or a combination thereof.

48. The process of claim 41, wherein the curative system comprises hexamethylene bis(sodium thiosulfate), hexamethylene bis(cinnamaldehyde), or a combination thereof.

49. The process of claim 47, wherein the polyfunctional curative system is present in the nanocomposite composition at 0.1 to 8 phr.

50. The process of claim 41, wherein the curative system comprises di-ortho-tolylguanidine salt of dicatechol borate, m-phenylene bis maleimide, 2,4,6-trimercapto-5 triazine, zinc diethyl dithiocarbamate, dipenta-methylene thiuram hexasulfide, alkylated phenol disulfide, phenol formaldehyde resin, brominated alkyl phenol formaldehyde resin, diphenyl phenylene diamine, salicyclic acid, wood rosin, tetramethyl thiuram disulfide in combination with sulfur, stearic acid, diphenyl guanidine, tetramethylthiuram disulfide, 4,4'-dithiodimorpholine, tetrabutylthiuram disulfide, 2,2'-benzothiazyl, N-tertiarybutyl-2-benzothiazole sulfenamide, N-oxydiethylene thiocarbamyl-N-oxydiethylene sulfonamide, zinc 2-ethyl hexanoate, N,N'-diethyl thiourea, or any combination thereof which would cure the nanocomposite.

51. The process of claim 41, wherein the curative system is added to the nanocomposite composition in an amount equal to 0.2 to 15 phr.

52. The process of claim 1, wherein the multifunctional intercalant is contacted with the clay at a temperature of 20° C. to 120° C., for a period of time of 1 minute to 24 hours.

53. The process of claim 1, wherein the at least partially intercalated clay is contacted with the functional interpolymer at a temperature of 40° C. to 140° C., for a period of time of 1 minute to 24 hours.

54. The process of claim 1, wherein the multifunctional intercalant is contacted with the clay in the presence of an acid such that the pH of the mixture of the multifunctional intercalant and the clay is below 7.

55. The process of claim 54, wherein the acid is selected from the group consisting of HCl, HBr, HI, HF, phosphoric acid, phosphorous acid, sulfuric acid, or a combination thereof.

56. The process of claim 1, wherein the intercalated clay is contacted with the functional interpolymer in the presence of a base such that the pH of the mixture of the intercalated clay and the functional interpolymer is above 7.

57. The process of claim 56, wherein the base is NaOH or KOH.

58. The process of claim 1, wherein the multifunctional intercalant is contacted with the clay at a pH of less than 5.

59. The process of claim 1, wherein the at least partially intercalated clay is contacted with the functionalized interpolymer at a pH of greater than 8.

60. The process of claim 1, wherein the cationic moiety of the multifunctional intercalant forms a linkage with the clay, and wherein the anionic moiety of the multifunctional intercalant forms an ester linkage with the functionalized interpolymer.

61. A process for preparing a nanocomposite composition, comprising:
   a) contacting a multifunctional intercalant comprising a cationic moiety separated from an anionic moiety by at least 1 carbon with a clay in the presence of a cationic surfactant at a temperature, for a period of time, and at an acidic pH sufficient to produce an at least partially intercalated clay;
   b) dissolving at least a portion of a functionalized interpolymer in a solvent to produce a functionalized interpolymer mixture wherein the functionalized interpolymer comprises $C_4$ to $C_7$ isoolefin derived units, multiolefin derived units and halogenated multiolefin derived units; and
   c) contacting the at least partially intercalated clay with the functionalized interpolymer mixture at a temperature, and for a period of time sufficient to produce the nanocomposite composition.

62. The process of claim 61, wherein the cationic moiety of the multifunctional intercalant forms a linkage with the clay, and wherein the anionic moiety of the multifunctional intercalant forms an ester linkage with the functionalized interpolymer.

63. The process of claim 61, further comprising a step of adding a secondary rubber component, a thermoplastic, a filler, a pigment, a curatives, or a combination thereof.

64. The process of claim 61, further comprising a step of extruding, compression molding, blow molding, drying, solvent removal, grinding, milling, or mixing to produce the nanocomposite composition.

65. The process of claim 1, further comprising a step of forming an article comprising the nanocomposite composition.

66. The article of claim 65, wherein the article is injection molded, a fiber, a film, an automotive part, an appliance housing, a consumer product, a packaging article, or a combination thereof.

67. The process of claim 1, further comprising the step of forming a tire innerliner or a tire inner tube comprising the nanocomposite composition.

68. The process of claim 1, wherein the nanocomposite composition comprises an at least partially intercalated clay having a $d_{100}$ d-spacing determine using X-ray diffraction of greater than 20 Angstroms.

69. The process of claim 1, wherein the nanocomposite composition comprises an at least partially intercalated clay having a $d_{100}$ d-spacing determine using X-ray diffraction of greater than 50 Angstroms.

70. The process of claim 1, wherein the nanocomposite composition comprises an at least partially intercalated clay having a $d_{100}$ d-spacing determine using X-ray diffraction of greater than 60 Angstroms.

71. The process of claim 41, further comprising a step of curing said nanocomposite composition to produce a cured nanocomposite composition.

72. The process of claim 71, wherein said cured nanocomposite composition has a d-spacing determine using X-ray diffraction of greater than 20 Angstroms.

73. The process of claim 71, wherein said cured nanocomposite composition has an oxygen transmission rate of less than 100 mm-cc/m² day at 40° C.

74. The process of claim 71, wherein said cured nanocomposite composition has an oxygen transmission rate of less than 90 mm-cc/m² day at 40° C.

75. The process of claim 61, wherein the functionalized interpolymer comprises a random elastomeric copolymer comprising $C_2$-$C_8$ olefin monomer, alkylstyrene monomer, and functionalized alkylstyrene monomer.

76. The process of claim 61, wherein the functionalized interpolymer comprises a halogenated rubber component selected from the group consisting of: brominated butyl rubber, chlorinated butyl rubber, star-branched polyisobutylene rubber, star-branched brominated butyl rubber; isobutylene/meta-bromomethylstyrene rubber, isobutylene/para-bromomethylstyrene rubber, isobutylene/chloromethylstyrene rubber, halogenated isobutylene cyclopentadiene rubber, isobutylene/para-chloromethylstyrene rubber, polychloroprene rubber, and combinations thereof.

77. The process of claim 61, wherein the clay comprises particles having a plurality of silicate platelets of a thickness of 0.8-1.2 nanometers, and exchangeable cations selected from the group consisting of $Na^+$; $Ca^{+2}$, $K^+$ and $Mg^{+2}$, present at an interlayer surface of the silicate platelets.

78. The process of claim 61, wherein the multifunctional intercalant is represented by the formula:

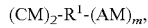

wherein:
CM is a cationic moiety;
$R^1$ comprises at least 1 carbon atom;
AM is an anionic moiety; and
n and m are each greater than or equal to 1.

79. The process of claim 78, wherein the multifunctional intercalant is represented by the structure $R^2R^3N$—$R^1AM$, or $R^2R^3R^4N+$—$R^1AM$, wherein $R^1$ is a $C_1$ to $C_{50}$ hydrocarbyl, substituted hydrocarbyl, halocarbyl, or substituted halocarbyl; and wherein $R^2$, $R^3$, and $R^4$ when present, are each independently, hydrogen, $C_1$ to $C_{30}$ hydrocarbyls, substituted hydrocarbyls, halocarbyls, or substituted halocarbyls.

80. The process of claim 61, wherein the intercalation modifier comprises a cationic surfactant selected from the group consisting of: polyoxyethylene tertiary $C_1$-$C_{18}$ alkylamines, polyoxypropylene tertiary $C_1$-$C_{18}$ alkylamines, $C_1$-$C_{18}$ substituted tertiary alkylamines, $C_1$-$C_{18}$ substituted tertiary alkenylamines, ethoxylated fatty amines, propoxylated fatty amines, $C_1$-$C_{18}$ alkyl-substituted fatty amines, polyoxyethylene $C_1$-$C_{18}$ alkyletheramines, polyoxypropylene $C_1$-$C_{18}$ alkyletheramines, polyoxyethylene cocoamines, polyoxypropylene cocoamines, polyoxyethylene tallowamines, polyoxypropylene tallowamines, polyoxyethylene quaternary tallowamines, polyoxypropylene quaternary tallowamines, distearyldimethylammonium chloride, distearyldimethylammonium bromide, N-dodecylpyridine chloride, N-dodecylpyridine bromide, dimethyldioctadecyl ammonium bromide, polyoxypropylene ethoxytrimethylammonium chloride, and polyoxypropylene ethoxytrimethylammonium bromide.

81. The process of claim 61, wherein the intercalated clay is contacted with the functional interpolymer in the presence of a base such that the pH of the mixture of the intercalated clay and the functional interpolymer is above 7.

* * * * *